(12) United States Patent
Dai

(10) Patent No.: US 11,439,059 B2
(45) Date of Patent: Sep. 13, 2022

(54) GRASS TRIMMER AND CONTROL METHOD OF GRASS TRIMMER

(71) Applicant: Nanjing Chervon Industry Co., Ltd., Nanjing (CN)

(72) Inventor: Xiubo Dai, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 17/357,568

(22) Filed: Jun. 24, 2021

(65) Prior Publication Data

US 2021/0321560 A1   Oct. 21, 2021

Related U.S. Application Data

(63) Continuation of application No. PCT/CN2019/129294, filed on Dec. 27, 2019.

(30) Foreign Application Priority Data

Dec. 28, 2018   (CN) .......................... 201811621277.0

(51) Int. Cl.
*A01D 34/416*   (2006.01)
*A01D 34/78*   (2006.01)

(52) U.S. Cl.
CPC ..... *A01D 34/4162* (2013.01); *A01D 34/4163* (2013.01); *A01D 34/4166* (2013.01); *A01D 34/78* (2013.01)

(58) Field of Classification Search
None
See application file for complete search history.

(56) References Cited

U.S. PATENT DOCUMENTS

| 9,560,799 B2* | 2/2017 | Hishida | A01D 34/4168 |
| 10,264,725 B2* | 4/2019 | Guo | A01D 34/4166 |
| 10,306,830 B2* | 6/2019 | Nolin | A01D 34/4166 |
| 10,440,882 B2* | 10/2019 | Guo | A01D 34/006 |

(Continued)

FOREIGN PATENT DOCUMENTS

| CN | 107148839 A | 9/2017 |
| CN | 208079804 U | 11/2018 |

(Continued)

OTHER PUBLICATIONS

ISA/CN, Int. Search Report issued on PCT application No. PCT/CN2019/129294, dated Feb. 6, 2020, 2 pages.

*Primary Examiner* — Hwei-Siu C Payer
(74) *Attorney, Agent, or Firm* — Greenberg Traurig, LLP

(57) ABSTRACT

A grass trimmer includes a grass trimmer head, a brushless motor, a drive circuit, and a controller. The grass trimmer head includes a spool and a head housing. The spool is configured to wind a grass trimmer rope. The head housing is configured to accommodate the spool. The grass trimmer has an automatic winding mode. In the automatic winding mode, the brushless motor drives at least one of the spool and the head housing so that the spool and the head housing rotate relatively and the grass trimmer rope is automatically wound onto the spool. The controller is configured to: in the automatic winding mode, output a control signal to the drive circuit according to at least one of the given voltage and the given current so that the rotation speed of the brushless motor is basically constant.

20 Claims, 15 Drawing Sheets

(56) References Cited

U.S. PATENT DOCUMENTS

| | | | | |
|---|---|---|---|---|
| 10,849,268 B2 * | 12/2020 | Guo | ................... | A01D 34/4166 |
| 2015/0034349 A1 * | 2/2015 | Proudlock | .............. | A01D 34/90 |
| | | | | 173/176 |
| 2021/0015035 A1 * | 1/2021 | Guo | ................... | A01D 34/4163 |
| 2021/0321560 A1 * | 10/2021 | Dai | ................... | A01D 34/4166 |

FOREIGN PATENT DOCUMENTS

| | | | |
|---|---|---|---|
| CN | 208079805 U | 11/2018 | |
| DE | 102007007987 A1 | 8/2008 | |
| JP | 2012228243 A | 11/2012 | |

\* cited by examiner

| Position of the Sector where the Target Voltage Vector $U_s$ is located | Basic Voltage Vector Switching Sequence | $S_A$、$S_B$、$S_C$ Switch states $S_A$, $S_B$, and $S_C$ and Three-Phase Oscillograms |
|---|---|---|
| I ($0°\leq\theta\leq60°$) | ...4-6-7-7-6-4... |  |
| II ($60°\leq\theta\leq120°$) | ...2-6-7-7-6-2... |  |
| III ($120°\leq\theta\leq180°$) | ...2-3-7-7-3-2... |  |

TABLE 4

| Position of the Sector where the Target Voltage Vector $U_s$ is located | Basic Voltage Vector Switching Sequence | $S_A$、$S_B$、$S_C$ Switch states $S_A$, $S_B$, and $S_C$ and Three-Phase Oscillograms |
|---|---|---|
| IV ($180° \leq \theta \leq 240°$) | ...1-3-7-7-3-1... |  |
| V ($240° \leq \theta \leq 300°$) | ...1-5-7-7-5-1... |  |
| VI ($300° \leq \theta \leq 360°$) | ...4-5-7-7-5-4... |  |

TABLE 4

GRASS TRIMMER AND CONTROL METHOD OF GRASS TRIMMER

RELATED APPLICATION INFORMATION

This application is a continuation of International Patent Application No. PCT/CN2019/129294 filed on Dec. 27, 2019, which claims the benefit and priority of Chinese Patent Application No. 201811621277.0 filed on Dec. 28, 2018, which are incorporated herein by reference in their entirety.

BACKGROUND

The grass trimmer is a garden tool used for trimming lawns. The grass trimmer includes a grass trimmer head, and the grass trimmer head rotates at a high speed to drive a grass trimmer rope mounted on the grass trimmer head to rotate so as to implement the cutting function.

The grass trimmer head includes a spool for the grass trimmer rope winding around, and the grass trimmer rope is gradually consumed due to wear when the grass trimmer operation is performed. After operation for a period of time, the user needs to replace the grass trimmer rope with a new grass trimmer rope and wind the new grass trimmer rope onto the spool. For a traditional grass trimmer rope, the user needs to manually rotate the spool to wind the grass trimmer rope onto the spool, which is troublesome to operate and low in winding speed. Therefore, the grass trimmer with an automatic winding mode came into being. The grass trimmer with the automatic winding mode can automatically wind the grass trimmer rope onto the spool. In the automatic winding mode, to facilitate winding, it is necessary to ensure that the motor driving the spool maintains a stable low-speed state. Since the related grass trimmer is limited by the structure of the grass trimmer head, in the automatic winding mode, the load fluctuates greatly, and thus the motor of the related grass trimmer cannot maintain a stable low-speed state.

SUMMARY

The grass trimmer includes a grass trimmer head, a brushless motor, a drive circuit, and a controller. The brushless motor is configured to drive the grass trimmer head to rotate to cut vegetation. The drive circuit is connected to the brushless motor to drive the brushless motor to output power. The controller is connected to the drive circuit to control the drive circuit. The grass trimmer head includes a spool and a head housing. The spool is configured to wind a grass trimmer rope. The head housing is configured to accommodate the spool. The grass trimmer has an automatic winding mode. In the automatic winding mode, the brushless motor drives at least one of the spool and the head housing so that the spool and the head housing rotate relatively and the grass trimmer rope is automatically wound onto the spool. The controller is configured to: in the automatic winding mode, output a control signal to the drive circuit according to at least one of a given voltage and a given current so that a rotation speed of the brushless motor is basically constant.

In one example, in the automatic winding mode, the spool and the head housing are subjected to varying resistances; the at least one of the given voltage and the given current enables the controller to output a control signal so that the at least one of the spool and the head housing overcomes a resistance with a maximum resistance value among the varying resistances.

In one example, the varying resistances fluctuate periodically.

In one example, the controller includes a PWM signal determination module and a PWM signal generation module. The PWM signal determination module is configured to calculate and determine, according to the given voltage, a PWM signal output by the controller so that the at least one of the spool and the head housing overcomes the resistance with the maximum resistance value among the varying resistances. The PWM signal generation module is configured to generate the PWM signal according to the PWM signal determined by the PWM signal determination module to control the drive circuit.

In one example, the PWM signal determination module includes a voltage vector giving unit, a vector action time unit, and a vector switching point unit. The voltage vector giving unit is configured to give a target voltage vector, where an amplitude of the target voltage vector is equal to an amplitude of the given voltage. The vector action time unit is configured to determine, according to the target voltage vector given by the voltage vector giving unit, action time of a basic voltage vector and a zero vector that synthesize the target voltage vector, where an input terminal of the vector action time unit is connected to an output terminal of the voltage vector giving unit. The vector switching point unit is configured to determine a switching time point of the basic voltage vector and the zero vector, where an input terminal of the vector switching point unit is connected to an output terminal of the vector action time unit.

In one example, the controller is configured to: in the automatic winding mode, output a control signal to the drive circuit according to the at least one of the given voltage and the given current to generate a rotating magnetic field in the brushless motor, and the at least one of the spool and the head housing rotates basically synchronously with the rotating magnetic field.

In one example, the at least one of the head housing and the spool rotates around a central axis, the central axis basically coincides with an axis of a drive shaft, and the drive shaft is driven by the brushless motor to drive the grass trimmer head. The spool is formed with a first inclined surface, the head housing is formed with a second inclined surface, and the first inclined surface and the second inclined surface are inclined to a normal plane of the central axis. In the automatic winding mode, the first inclined surface and the second inclined surface contact each other and slide relatively so that the spool and the head housing rotate relatively.

In one example, the spool is formed with multiple first meshing teeth arranged circumferentially around the central axis, and the multiple first meshing teeth are formed with the first inclined surface. The head housing is formed with multiple first engaging teeth engaged with the multiple first meshing teeth, and the multiple first engaging teeth are formed with the second inclined surface.

In one example, two adjacent first meshing teeth among the multiple first meshing teeth are spaced apart from each other by a second dimension in a circumferential direction of the central axis.

In one example, the grass trimmer further has a cutting mode. In the cutting mode, the multiple first meshing teeth and the multiple first engaging teeth stop each other. In the automatic winding mode, the multiple first meshing teeth and the multiple first engaging teeth contact each other and slide relatively.

In one example, the first inclined surface formed on each of the multiple first meshing teeth is inclined along the circumferential direction of the central axis. The second inclined surface formed on each of the multiple first engaging teeth is inclined along the circumferential direction of the central axis.

In one example, the grass trimmer further has a cutting mode. In the cutting mode, the spool and the head housing rotate synchronously; the controller is configured to: in the cutting mode, control the drive circuit in a first control mode so that the brushless motor operates at a first rotation speed; and in the automatic winding mode, control the drive circuit in a second control mode so that the brushless motor operates at a second rotation speed, where the second rotation speed is less than the first rotation speed.

In one example, a value range of a ratio of the first rotation speed to the second rotation speed is 10 to 100.

In one example, the controller is configured to: in the cutting mode, enable the brushless motor to rotate along a first direction at the first rotation speed; and in the automatic winding mode, enable the brushless motor to rotate along a second direction at the second rotation speed, where the first direction is opposite to the second direction.

In one example, the grass trimmer is powered by a power supply, and a value range of a ratio of the given voltage to a voltage of the power supply is 0.1 to 0.5.

In one example, in a control method of the grass trimmer, the grass trimmer has an automatic winding mode, the grass trimmer includes a grass trimmer head, a brushless motor configured to drive the grass trimmer head, a drive circuit configured to drive the brushless motor to operate, and a controller configured to control the drive circuit. The control method of the grass trimmer includes: in the automatic winding mode, outputting a control signal to the drive circuit according to at least one of a given voltage and a given current so that a rotation speed of the brushless motor is basically constant.

In one example, the grass trimmer head includes a spool and a head housing, the spool is configured to wind a grass trimmer rope, and the head housing is configured to accommodate the spool; in the automatic winding mode, the spool and the head housing are subjected to varying resistances; the at least one of the given voltage and the given current enables at least one of the spool and the head housing to overcome a resistance with a maximum resistance value among the varying resistances.

In one example, the control method of the grass trimmer includes giving a target voltage vector, where an amplitude of the target voltage vector is equal to an amplitude of the given voltage; determining a basic voltage vector and a zero vector that synthesize the target voltage vector; determining action time of the basic voltage vector and the zero vector; determining a switching time point of the basic voltage vector and the zero vector; and determine a PWM signal according to the basic voltage vector, the zero vector, and the switching time point of the basic voltage vector and the zero vector.

In one example, the at least one of the head housing and the spool rotates around a central axis, the central axis basically coincides with an axis of a drive shaft, and the drive shaft is driven by the brushless motor to drive the grass trimmer head. The spool is formed with a first inclined surface, the head housing is formed with a second inclined surface, and the first inclined surface and the second inclined surface are inclined to a normal plane of the central axis. In the automatic winding mode, the first inclined surface and the second inclined surface contact each other and slide relatively so that the spool and the head housing rotate relatively.

In one example, the grass trimmer further has a cutting mode. In the cutting mode, the spool and the head housing rotate synchronously; the controller is configured to: in the cutting mode, control the drive circuit in a first control mode so that the brushless motor operates along a first direction at a first rotation speed; and in the automatic winding mode, control the drive circuit in a second control mode so that the brushless motor operates along a second direction at a second rotation speed, where the second rotation speed is less than the first rotation speed, and the second direction is opposite to the first direction.

Through the grass trimmer and the control method of the grass trimmer of the present application, in a case where the grass trimmer is in an automatic winding mode, the control effect of stable low speed and high torque of the motor can be achieved; moreover, the rotation speed of the motor is not affected by load fluctuations and remains basically constant, the winding speed is more stable, and thus the user experience is better.

DETAILED DESCRIPTION

The present application will be described below in detail in conjunction with drawings and examples.

Figure 1:
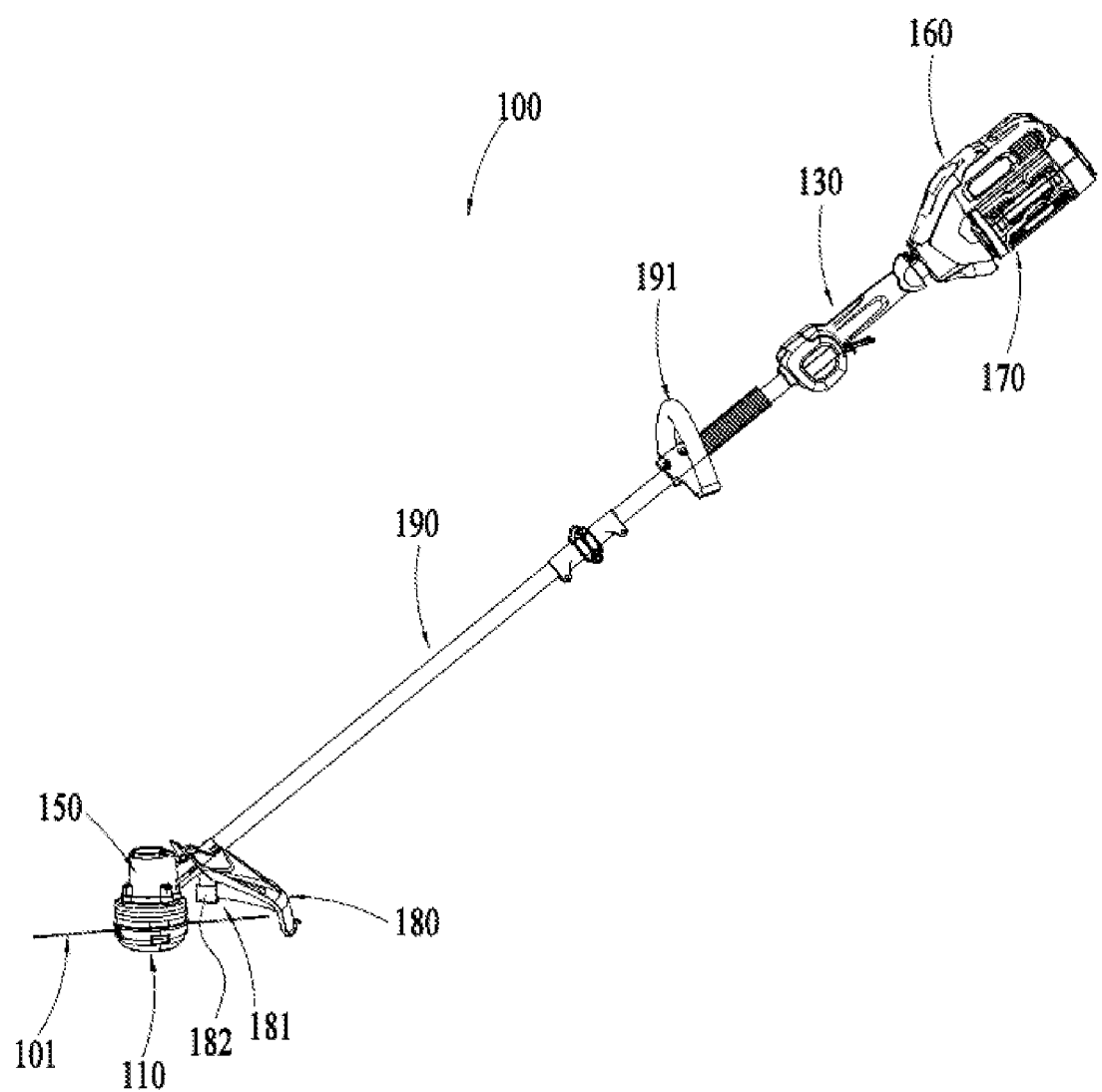
FIG. 1 is a schematic view of a grass trimmer according to an example.
Figure 2:
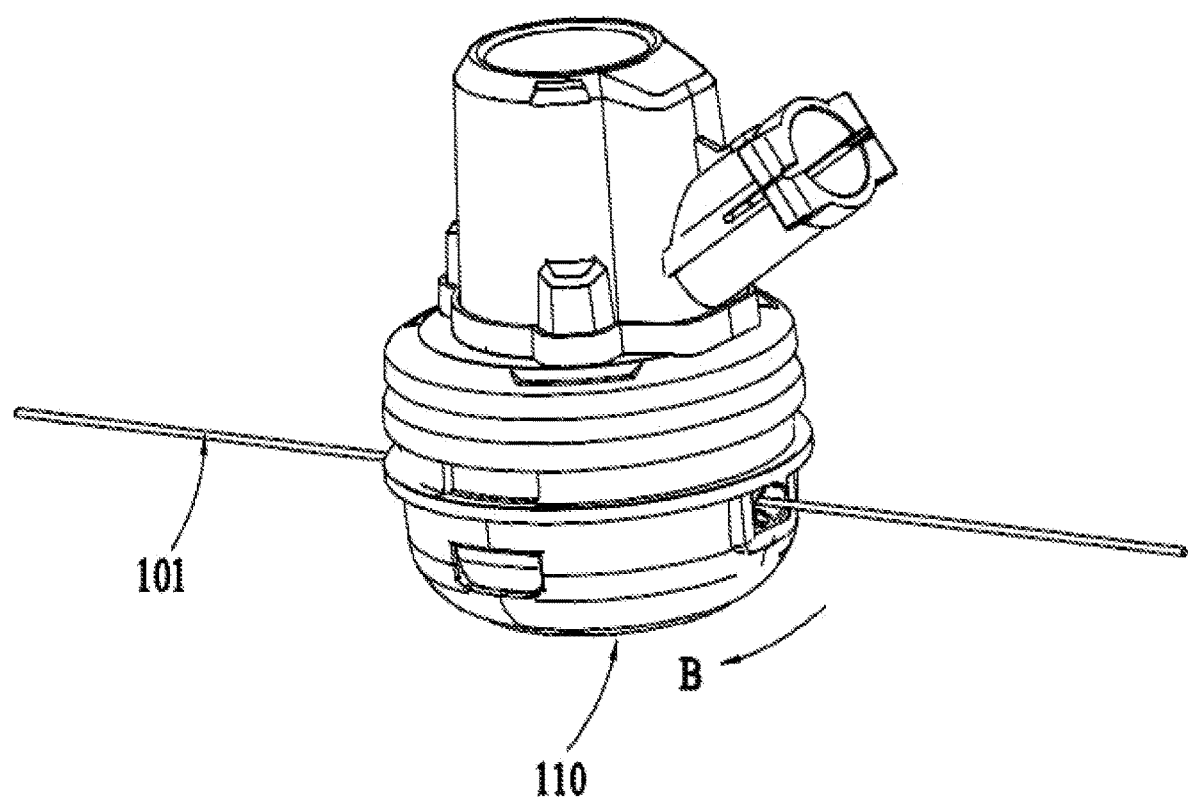
FIG. 2 is a partial structure view of FIG. 1.
Figure 3:
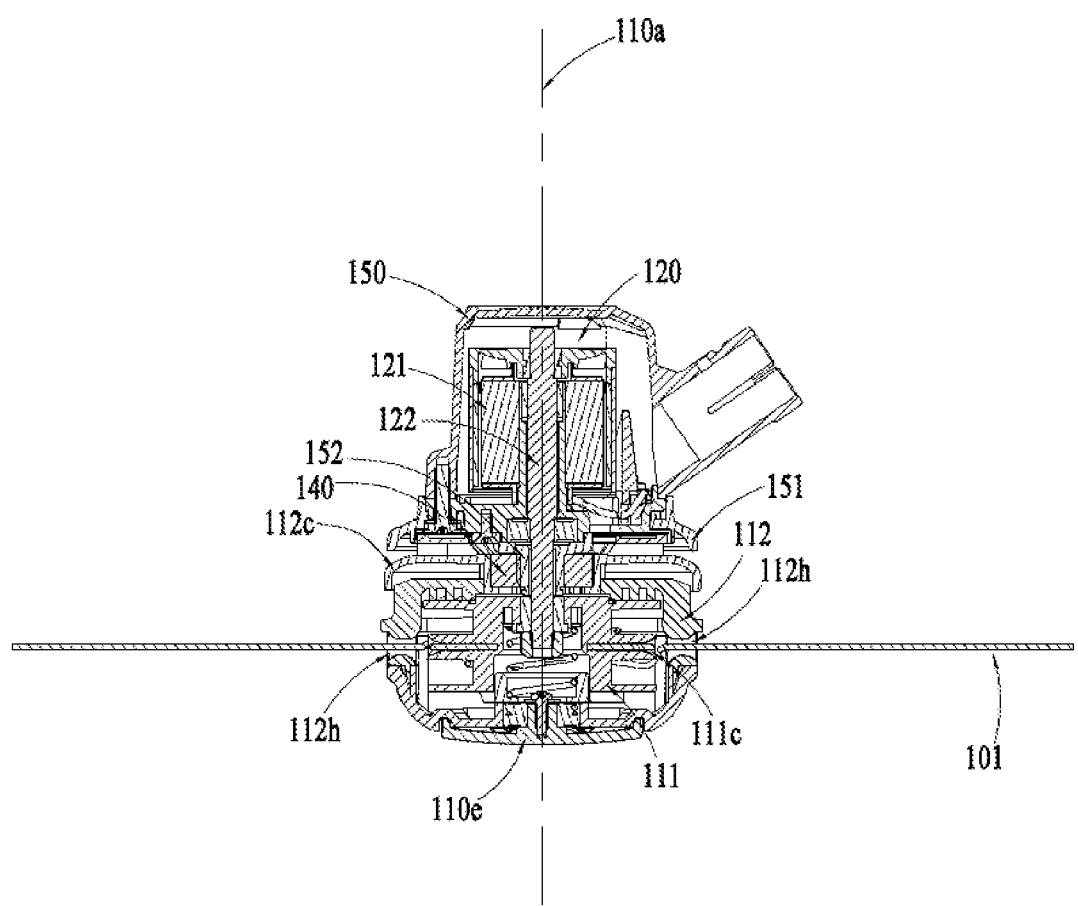
FIG. 3 is a sectional view of the structure of FIG. 2.

Referring to FIGS. 1 to 3, as an example, a grass trimmer 100 includes a grass trimmer head 110, a drive device 120, and an operation device 130.

The grass trimmer head 110 is configured to mount and store a grass trimmer rope 101. Part of the grass trimmer rope 101 is stored inside the grass trimmer head 110, and another part of the grass trimmer rope 101 extends out of the grass trimmer head 110 and is configured to cut vegetation in a case where the grass trimmer head 110 rotates. A user operates the operation device 130 to control the grass trimmer 100. The drive device 120 drives the grass trimmer head 110 to rotate around one central axis 110a so that the grass trimmer rope 101 is driven to rotate and cut vegetation.

Referring to FIG. 3, the drive device 120 includes a motor 121 and a drive shaft 122. The drive shaft 122 is connected to a rotor 121a of the motor 121 and is driven by the rotor 121a of the motor 121, and the motor 121 is configured to drive the grass trimmer head 110 to rotate to cut vegetation. The drive shaft 122 is connected to the grass trimmer head 110 in an anti-rotation manner to drive the grass trimmer head 110 to rotate. As an example, the motor 121 is a brushless motor 901 (FIG. 9), and the motor 121 further includes a rotor 121a. In some examples, the drive shaft 122 is a motor shaft of the motor 121, the central axis 110a is an axis of the motor shaft, and the drive shaft 122 is mechanically connected to the motor shaft of the motor 121.

The grass trimmer 100 further includes a first housing 150 and a second housing 160. The function of the first housing 150 is to mount and accommodate the motor 121. The grass trimmer 100 is powered by a power supply, and the power supply may be a DC power supply or an AC power supply. In this example, the power supply is a battery pack 170, the battery pack 170 serves as an energy source to power at least power the motor 121 in the grass trimmer 100, and the second housing 160 is configured to detachably fit the battery pack 170.

A circuit board is further accommodated in the second housing 160, and the circuit board is electrically connected to the motor 121 so that the battery pack 170 powers the motor 121 and controls the motor 121. A connection rod assembly 190 connects the first housing 150 and the second housing 160. The operation device 130 is fixed to the connection rod assembly 190. The grass trimmer 100 further includes an auxiliary handle 191 for the user to hold, and the auxiliary handle 191 is fixed to the connection rod assembly 190.

The grass trimmer rope 101 is mounted to the grass trimmer head 110. A protective shield 180 is configured to achieve a safety protection function so that the grass trimmer rope 101 is protected from causing harm to the user.

Figure 4:
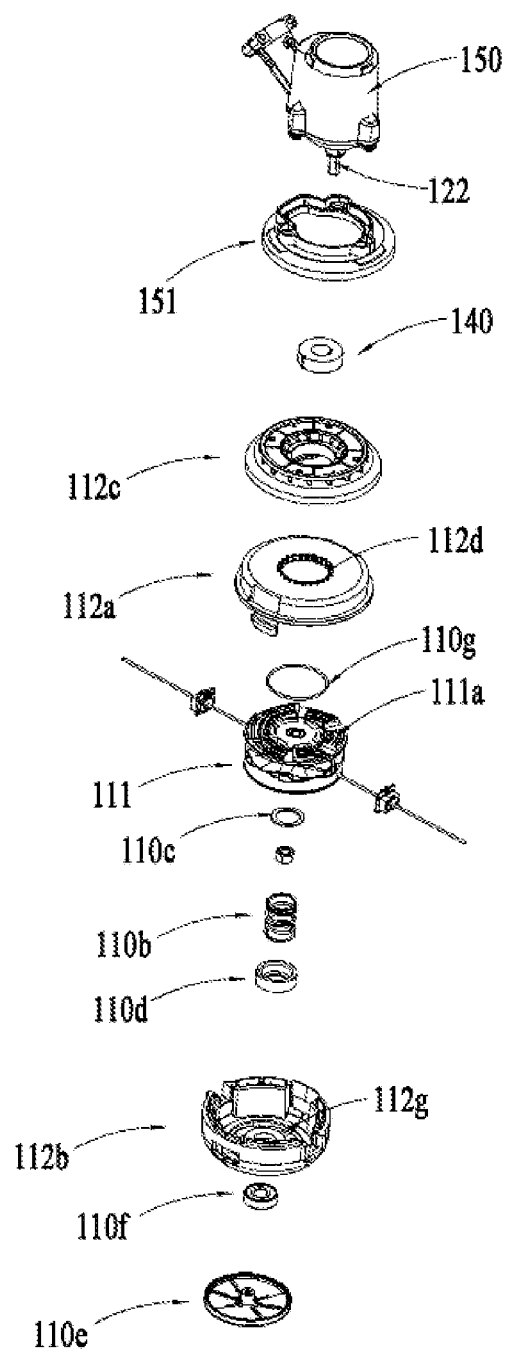
FIG. 4 is an exploded view of the structure of FIG. 2.
Figure 5:
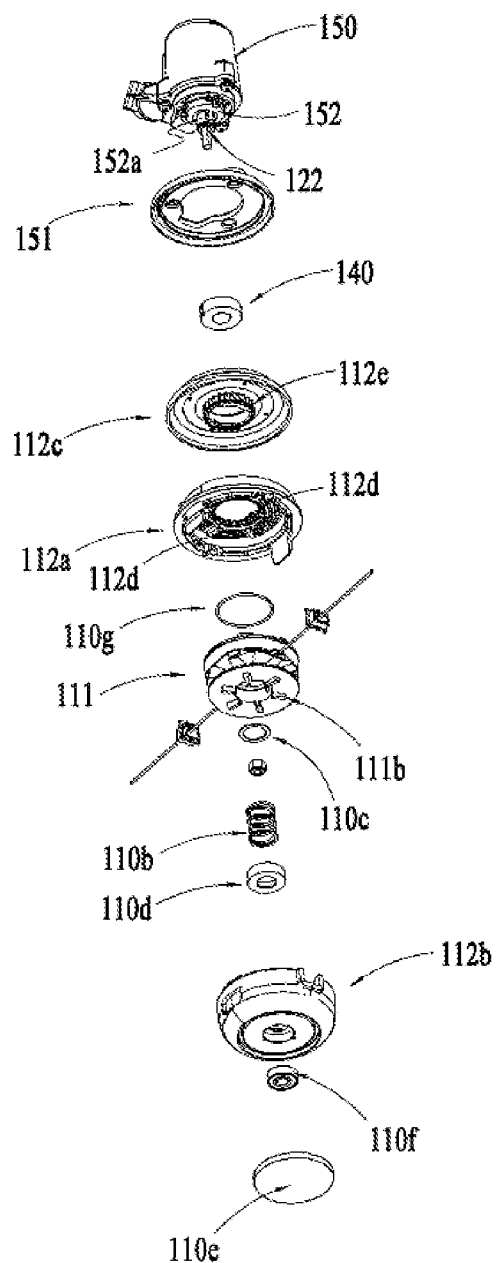
FIG. 5 is an exploded view of the structure of FIG. 2 taken from another perspective.
Figure 6:
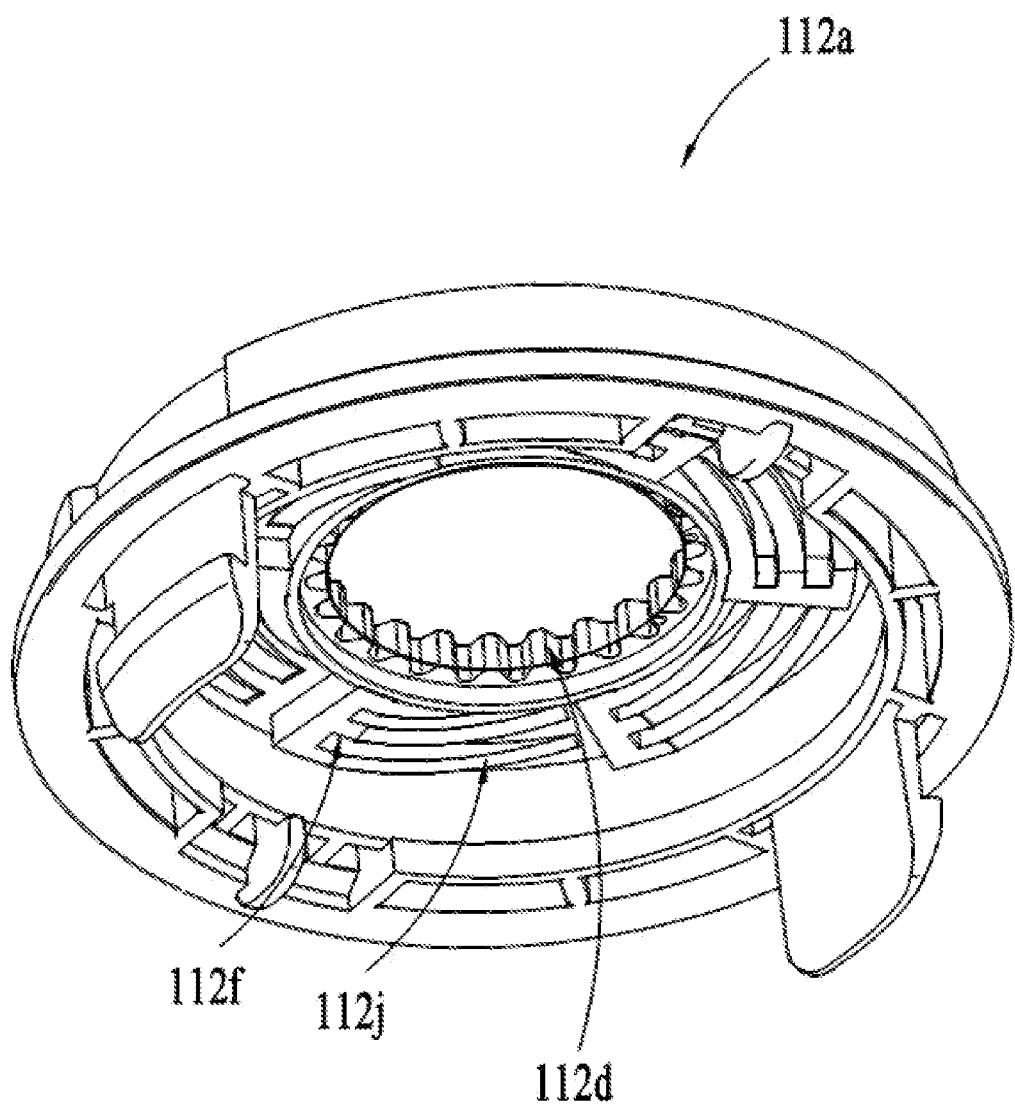
FIG. 6 is a schematic view of an upper cover of a head housing of FIG. 5.

Referring to FIGS. 3 to 5, the grass trimmer head 110 includes a spool 111 and a head housing 112.

The spool 111 is configured to wind the grass trimmer rope 101 and be connected to the drive shaft 122 so that the spool is driven by the drive shaft 122 to rotate around the central axis 110a.

The head housing 112 includes an upper cover 112a and a lower cover 112b. The grass trimmer head 110 further includes a fan 112c. The fan 112c is formed with blades for generating airflow. The motor 121 is able to drive the fan 112c to rotate to generate airflow.

In the solutions shown in FIGS. 4 and 5, a one-way bearing 140 as a damping device is further provided. The function of the one-way bearing 140 is to enable the head housing 112 and the motor 121 to form a one-way rotation connection. One support piece 152 is further provided. The support piece 152 is connected to the motor 121 and allows the drive shaft 122 to pass through. A boss portion 152a (FIG. 5) is formed to support an inner ring of the one-way bearing 140. The one-way bearing 140 is not directly connected to the head housing 112 and is disposed between the support piece 152 and the fan 112c so that the fan 112c only rotates in one direction relative to the support piece 152, and since the fan 112c and the head housing 112 form a connection in an anti-rotation manner, the head housing 112 only rotates in one direction relative to the support piece 152.

The upper cover 112a is formed with first connection teeth 112d, the fan 112c is formed with second connection teeth 112e with the first connection teeth 112d, and the first connection teeth 112d and the second connection teeth 112e cooperate to achieve the synchronous rotation of the upper cover 112a and the fan 112c. The guiding function of the first connection teeth 112d and the second connection teeth 112e enables the head housing 112 to slide relative to the fan 112c along the central axis 110a and enables the fan 112c to rotate with the head housing 112 around the central axis 110a, that is, the fan 112c and the head housing 112 form a connection in an anti-rotation manner.

The grass trimmer 100 further includes a protective cover 151. The protective cover 151 is fixed to the first housing 150. The protective cover 151 covers the blades of the fan 112c at least in a radial direction of the central axis 110a to prevent grass clippings from entangled with the fan 112c. Moreover, the protective cover 151 changes the flow direction of the airflow of the fan 112c so that the airflow generated by the fan 112c blows grass clippings outward along the radial direction of the central axis 110a.

The drive shaft 122 directly drives the spool 111 to rotate, and the head housing 112 may rotate relative to the spool 111 or may slide in the axial direction (that is, the direction of the central axis 110a) relative to the spool 111.

At least one of the head housing 112 and the spool 111 rotates around the central axis 110a, the central axis 110a basically coincides with an axis of the drive shaft 122, and the drive shaft 122 is driven by the brushless motor 901 to drive the grass trimmer head 110.

The spool 111 is formed with a first inclined surface 111h, and the head housing 112 is formed with a second inclined surface 112j, the first inclined surface 111h and the second inclined surface 112j are inclined to a normal plane of the central axis 110a, and the normal plane of the central axis 110a is perpendicular to the central axis 110a. In the automatic winding mode, the first inclined surface 111h and the second inclined surface 112j contact each other and slide relatively so that the spool 111 and the head housing 112 rotate relatively.

As a specific example, the spool 111 is formed with multiple first meshing teeth 111a arranged circumferentially around the central axis 110a; the head housing 112 is formed with multiple first engaging teeth 112f engaged with the multiple first meshing teeth 111a, the multiple first meshing teeth 111a is formed with the first inclined surface 111h, the multiple first engaging teeth 112f is formed with the second inclined surface 112j, and the first inclined surface 111h and the second inclined surface 112j are inclined to the normal plane of the central axis 110a; in the automatic winding mode, the first inclined surface 111h and the second inclined surface 112j contact each other and slide relatively so that the spool 111 and the head housing 112 rotate relatively. Two adjacent first meshing teeth 111a among the multiple first meshing teeth 111a are spaced apart from each other by a second dimension in a circumferential direction of the central axis 110a. The first inclined surface 111h formed on each first meshing tooth is inclined along the circumferential direction of the central axis 110a; the second inclined surface 112j formed on each first engaging tooth 112f is inclined along the circumferential direction of the central axis 110a.

Referring to FIGS. 4 to 7, the first meshing teeth 111a are formed on the upper part of the spool 111, and the first meshing teeth 111a are helical teeth. The first engaging teeth 112f are formed in the head housing 112, and the first engaging teeth 112f are formed on the upper cover 112a.

Since the first meshing teeth 111a and the first engaging teeth 112f are designed with inclined surfaces, the first meshing teeth 111a and the first engaging teeth 112f may only be transmitted in one direction. In the case where the grass trimmer 100 is in a cutting mode, the first engaging teeth 112f and the first meshing teeth 112a are in a mutual stopping state so that the spool 111 drives the head housing 112 to rotate synchronously when the spool 111 rotates. In the case where the grass trimmer 100 is in the automatic winding mode, when the spool 111 and the head housing 112 rotate in opposite directions, due to sliding caused by the inclined surfaces, the first engaging teeth 112f and the first meshing teeth 111a slide relatively so that the spool 111 and the head housing 112 may rotate continuously relative to each other. That is, in the cutting mode, the first meshing teeth 111a and the first engaging teeth 112f stop each other; in the automatic winding mode, the first meshing teeth 111a and the first engaging teeth 112f contact each other and slide relatively.

Optionally, second meshing teeth 111b are formed on the lower part of the spool 111, second engaging teeth 112g are formed in the head housing 112, the second engaging teeth 112g are formed on the lower cover 112b, and the second meshing teeth 111b and the second engaging tooth 112g are formed with inclined surfaces. The second meshing teeth 111b and the second engaging teeth 112g form a fit in the case where the head housing 112 is at a second axial position relative to the spool 111. The transmission surfaces of the second meshing teeth 111b and the second engaging teeth 112g are designed as inclined surfaces. Since the transmission surfaces are designed as inclined surfaces, sliding occurs between the second meshing teeth 111b and the second engaging teeth 112g. Therefore, in the case where the head housing 112 is at the second axial position relative to the spool 111, the head housing 112 cannot be completely driven by the spool 111 and the head housing 112 still rotates relative to the spool 111.

Through the preceding structure, in the case where the motor 121 reverses, the drive shaft 122 drives the spool 111 to reverse, and since the one-way bearing 140 prevents the head housing 112 from reversing, the spool 111 and the head housing 112 move relatively. In this case, since the contact surface between the spool 111 and the head housing 112 is an inclined surface, the first meshing teeth 111a and the first engaging teeth 112f cannot completely hinder the relative movement of the spool 111 and the head housing 112. Therefore, the spool 111 and the head housing 112 move relative to each other continuously in this case so that the grass trimmer may execute the automatic winding mode. However, due to the inclined surface, although the first meshing teeth 111a and the first engaging teeth 112f cannot completely hinder the relative movement of the spool 111 and the head housing 112, the spool 111 and the head housing 112 receive varying resistances. Specifically, the varying resistances fluctuate periodically.

The grass trimmer head 110 further includes a spring 110b, and the spring 110b applies a force between the lower cover 112b and the spool 111 to bias the head housing 112 to an axial position that rotates synchronously with the spool 111. In this case, the head housing 112 is at a first axial position relative to the spool 111.

The grass trimmer head 110 further includes a first contact piece 110c and a second contact piece 110d. The spring 110b is disposed between a first contact piece 110d and a second contact piece 110d. The spring 110b may directly act on the first contact piece 110c and the second contact piece 110d. The first contact piece 110c and the second contact piece 110d may prevent the spring 110b from abrading the spool 111 and the head housing 112. The first contact piece 110d and the second contact piece 110d are metal pieces.

The grass trimmer head 110 further includes a knocking cap 110e. The knocking cap 110e is rotatably connected to the lower cover 112b. A bearing 110f is disposed between the knocking cap 110e and the lower cover 112b so that the knocking cap 110e and the lower cover 112b rotate relatively. At the same time, the knocking cap 110e and the lower cover 112b move synchronously in the direction of the axis 110a. That is, in the case where the position of the knocking cap 110e is changed, the lower cover 112b may also move together. That is, the axial position at which the head housing 112 is located may be changed by knocking the knocking cap 110e.

In the case where the grass trimmer 100 executes the cutting mode, the user knocks the grass trimmer head 110, and the knocking cap 110e contacts the ground so that the head housing 112 slides to a position where the first engaging teeth 112f and the first meshing teeth 111a are disengaged, and thus the first engaging teeth 112f and the first meshing teeth 111a rotate relatively; knocking makes the head housing 112 slide to the second axial position relative to the spool 111 so that the head housing 112 rotates relative to the spool 111 at a relatively low relative rotation speed, and thus part of the grass trimmer rope 101 wound onto the spool 111 is released to the outside of the head housing 112, and the grass trimmer 100 executes a setting out mode. The advantage of this arrangement is that in the case where the motor 121 still rotates at the rotation speed in the cutting mode, the relative rotation speed of the head housing 112 and the spool 111 is controlled so that the user is prevented from releasing an excessive amount of the grass trimmer rope 101 every time the user knocks.

The knocking cap 110e may rotate freely relative to the lower cover 112b under the action of the bearing 110f so that the abrasion of the grass trimmer head 110 is reduced. The spring 110b applies a force to the head housing 112 so that the head housing 112 moves downward relative to the spool 111. A shock absorber 110g for reducing the impact between the upper cover 112a and the spool 111 is disposed between the upper cover 112a and the spool 111. The shock absorber 110g may be a rubber gasket.

Referring to FIG. 3, the spool 111 is formed with an inner threading hole 111c for fixing the grass trimmer rope 101. The head housing 112 is formed with an outer threading hole 112h that allows the grass trimmer rope 101 to pass from the inside of the head housing 112 to the outside of the head housing 112. After the cutting mode is finished, the outer threading hole 112h and the inner threading hole 111c are automatically aligned in the circumferential direction. Alternatively, in the case where the grass trimmer head 110 is not mounted with the grass trimmer rope 101 and the motor 121 stops, the outer threading hole 112h and the inner threading hole 111c are automatically aligned in the circumferential direction.

The spool 111 is formed with multiple inner threading holes 111c (FIG. 3), and the number of the inner threading holes 111c is an even number. The multiple inner threading holes 111c are evenly distributed in the circumferential direction of the axis 110a of the spool 111. The number of the first meshing teeth 111a corresponds to the number of the inner threading holes 111c. Similarly, the number of the second meshing teeth 111b corresponds to the number of the inner threading holes 111c. In this example, the spool 111 is formed with six inner threading holes 111c. The spool 111 is formed with six first meshing teeth 111a and six second meshing teeth 111b. Two adjacent first meshing teeth 111a among the multiple first meshing teeth 111a are spaced apart from each other by a second dimension in the circumferential direction of the central axis 110a.

Figure 7:
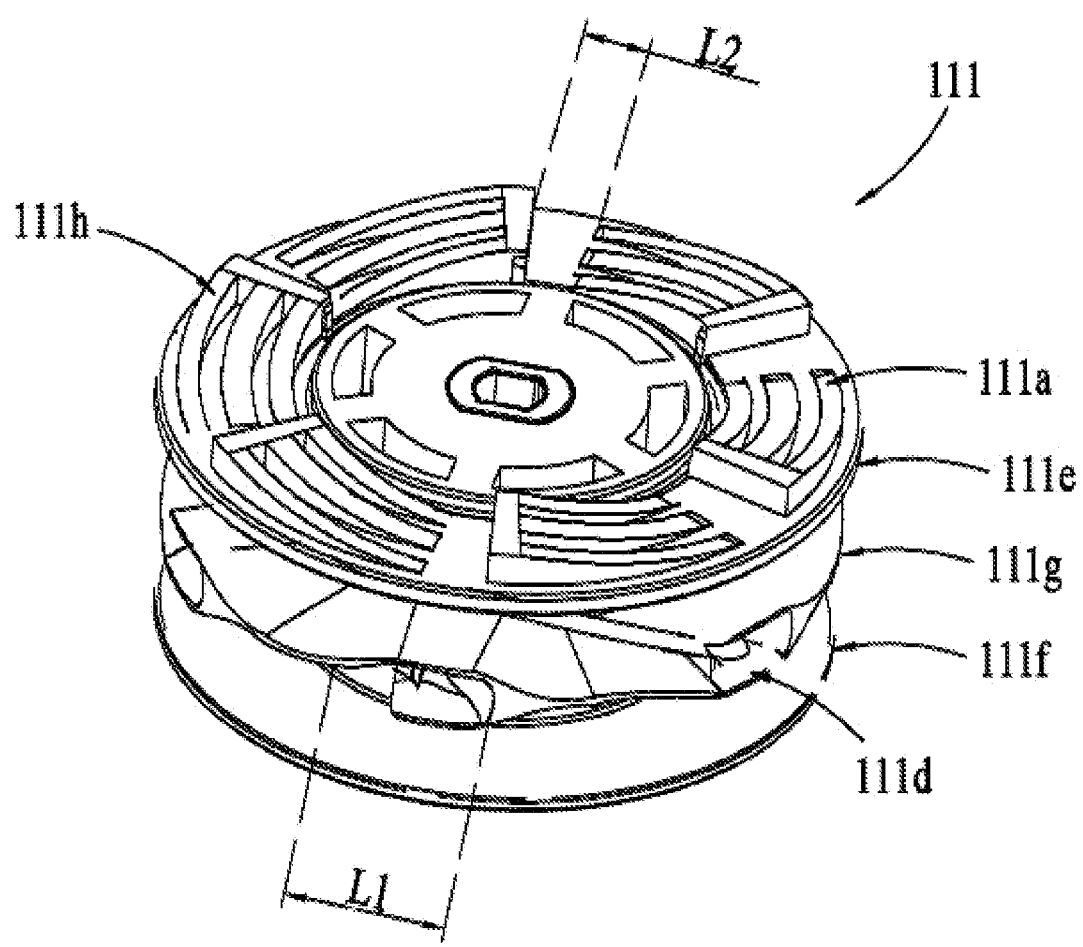
FIG. 7 is a schematic view of a spool of FIG. 5.

Referring to FIG. 7, the spool 111 is formed with a guiding opening 111d for guiding the grass trimmer rope 101 into the inner threading hole 111c, and the guiding opening 111d gradually expands along a radial direction of a rotation axis of the spool 111. The maximum dimension L1 of the guiding opening 111d in the circumferential direction of the axis 110a is greater than the maximum dimension L2 of two connected first meshing teeth in the circumferential direction of the axis 110a.

In the case where the grass trimmer 100 executes the cutting mode, the transmission surfaces of the first meshing teeth 111a and the first engaging teeth 112f are arranged such that in the case where the motor 121 stops, the outer threading hole 112h and the inner threading hole 111c are automatically aligned in the circumferential direction. The alignment referred to herein means that the grass trimmer rope 101 passing through the outer threading hole 112h may be directly guided into the inner threading hole 111c.

Two ends of the spool 111 are respectively formed with a first flange 111e and a second flange 111f. A partition plate 111g is formed in the middle of the spool 111. A first winding part for winding and accommodating the grass trimmer rope 101 is formed between the first flange 111e and the partition plate 111g; and a second winding part for winding and accommodating the grass trimmer rope 101 is formed between the second flange 111f and the partition plate 111g.

In the cutting mode, the rotation of the drive shaft 122 drives the spool 111 to rotate, and the spool 111 drives the upper cover 112a to rotate. The upper cover 112a drives the fan 112c to rotate. Under the action of the one-way bearing 140, the fan 112c may rotate in the first direction (referring to the direction indicated by the arrow B in FIG. 2) relative to the second housing 160. In this case, the motor 121 rotates in the forward direction to drive the spool 111 and the head housing 112 to rotate along the first direction.

In the case where the user needs to supplement the grass trimmer rope 101, the user may pass each of two ends of one grass trimmer rope 101 through a respective one of two opposite outer threading holes 112h of the head housing 112, and then insert each of the two ends of the grass trimmer rope 101 into a respective one of two opposite inner threading holes 111c of the spool 111. Of course, the user may also insert two grass trimmer ropes 101 into two inner threading holes 111c respectively. In this case, the user controls the grass trimmer 100 so that the grass trimmer 100 executes the automatic winding mode. The motor 121 rotates in the reverse direction to drive the spool 111 to rotate in the second direction opposite to the first direction. Due to the anti-rotation effect of the one-way bearing 140, the fan 112c and the head housing 112 cannot rotate along the second reverse direction, and a winding shaft 111 may rotate in the second direction relative to the head housing 112 under the drive of the drive shaft 122 so that the automatic winding is achieved.

The reason is that the first meshing teeth 111a and the second meshing teeth 111b, and the first engaging teeth 112f and the second engaging teeth 112g between the head housing 112 and the spool 111 are formed with inclined surfaces inclined to the normal plane of the central axis 110a. In the case where the motor 121 reverses, the inclined surfaces of the first meshing teeth 111a and the second meshing teeth 111b contact the inclined surfaces of the first engaging teeth 112f and the second engaging teeth 112g. Since sliding occurs between the inclined surfaces, the inclined surfaces cannot prevent the relative rotation of the spool 111 and the head housing 112, and the spool 111 may rotate in the second direction relative to the head housing 112 so that the automatic winding is achieved.

In the automatic winding mode, in the case where enough grass trimmer rope 101 has been wound onto the spool 111, the user needs to cut off the excessively long grass trimmer rope 101 that has not yet been wound. The grass trimmer 100 further includes a rope cutting device 181 (as shown in FIG. 1). The rope cutting device 181 automatically cuts off the grass trimmer rope 101 in the automatic winding mode.

The rope cutting device 181 includes a rope cutting element 182, and the grass trimmer head 110 may rotate relative to the rope cutting element 182. The rope cutting element 182 is fixed to the protective shield 180. In this manner, in the automatic winding mode, the grass trimmer rope 101 may be driven by the grass trimmer head 110 to pass through the rope cutting element 182, and the grass trimmer rope 101 is cut off by the rope cutting element 182 after being tightened. In the cutting mode or in the setting out mode, the rope cutting element 182 may break the grass trimmer rope 101, and the middle part of the grass trimmer rope 101 is broken so that two sections of the grass trimmer rope 101 occur. Of course, the grass trimmer rope 101 may be knocked off directly in a knocking manner in the case where the grass trimmer rope 101 is tightened on the outer side of the head housing 112.

Figure 8:
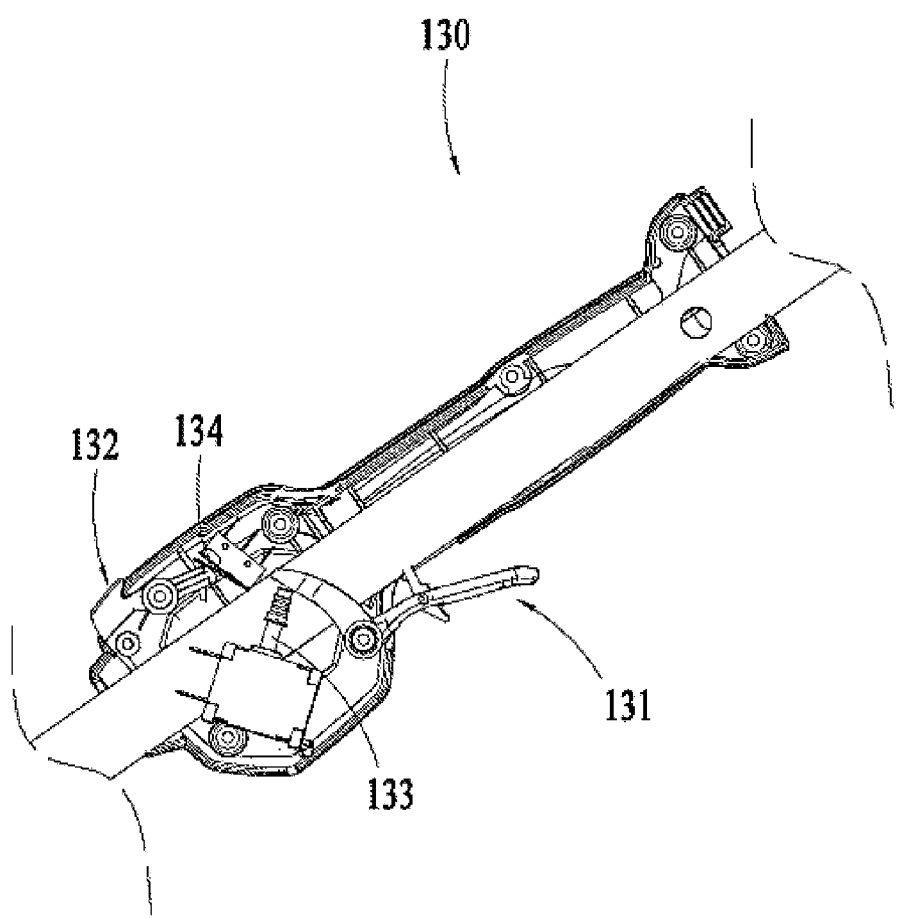
FIG. 8 is a schematic view of an operation device of FIG. 1.

As shown in FIG. 8, the operation device 130 includes a first operation piece 131 and a second operation piece 132. The first operation piece 131 has an initial state and a first preset operation state. The second operation piece 132 has an initial state and a second preset operation state. In the case where the first operation piece 131 is in the first preset operation state and the second operation piece 132 are in the second preset operation state, the grass trimmer 100 may start the automatic winding mode. The operation device 130 includes a first reset assembly 133 and a second reset assembly 134. The first reset assembly 133 enables the first operation piece 131 to leave the first preset state in the case where the user does not operate the first operation piece 131. The second reset assembly 134 enables the second operation piece 132 to leave the second preset state in the case where the user does not operate the second operation piece 132. In the case where the user does not operate the second operation piece 132 and only operates the first operation piece 131, that is, in the case where the second operation piece 132 is not in the second preset operation state, the user operates the first operation piece 131 such that the first operation piece 131 moves to the first preset operation state, and the grass trimmer 100 is in the cutting mode in this case.

Figure 9:
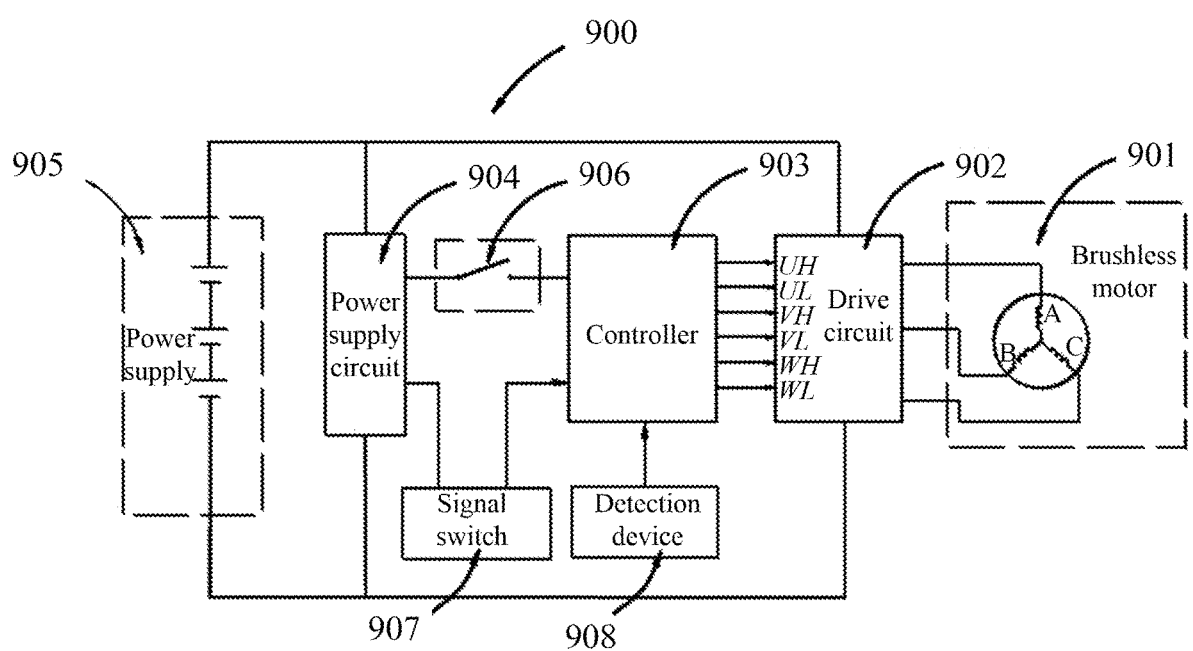
FIG. 9 is a circuit block diagram of a grass trimmer according to an example.

Referring to FIG. 9, the operation of the grass trimmer 100 also depends on a circuit system 900 composed of circuit components. As an example, the motor 121 is the brushless motor 901, and the grass trimmer 100 further includes a drive circuit 902, a controller 903, and a power supply circuit 904. The brushless motor 901, the drive circuit 902, the controller 903, the power supply circuit 904, and the power supply 905 are electrically connected to form the circuit system 900 of the grass trimmer 100. The brushless motor 901 includes three-phase windings that form a Y-shaped connection. Of course, the three-phase windings may also form a delta connection.

The brushless motor 901 outputs power to drive the grass trimmer head 110 to rotate to cut vegetation. The brushless motor 901 includes a stator, a rotor 121a, a motor shaft, and windings. The motor shaft directly serves as the drive shaft 122. The rotor 121a includes magnetic materials such as a permanent magnet and a magnetic steel sheet. The rotor 121a is fixedly connected to the drive shaft 122 so that the rotor 121a may drive the drive shaft 122 to rotate, and thus the grass trimmer head is driven to rotate. The stator has an iron core and stator windings arranged on the stator iron core. After the stator windings are energized, a magnetic field is generated to drive the rotor to rotate. In this example, the brushless motor 901 has three-phase windings. The three-phase windings are a first-phase winding A, a second-phase winding B, and a third-phase winding C, respectively.

The drive circuit 902 is electrically connected to the brushless motor 901 and is configured to drive the brushless motor 901 to output power. Specifically, the drive circuit 902 is electrically connected to the three-phase windings of the brushless motor 901 to drive the brushless motor 901 to operate. Specifically, the drive circuit 902 includes a switch circuit, and the switch circuit is configured to drive the brushless motor 901 to operate according to a control signal of the controller 903. In this example, the drive circuit 902 is a three-phase bridge circuit, the three-phase bridge circuit includes three bridge arms, each bridge arm is provided with two switch elements, a branch is drawn between two power transistors located on the same bridge arm in the three bridge arms and is connected to the three-phase windings of the brushless DC motor, respectively.

Figure 10:
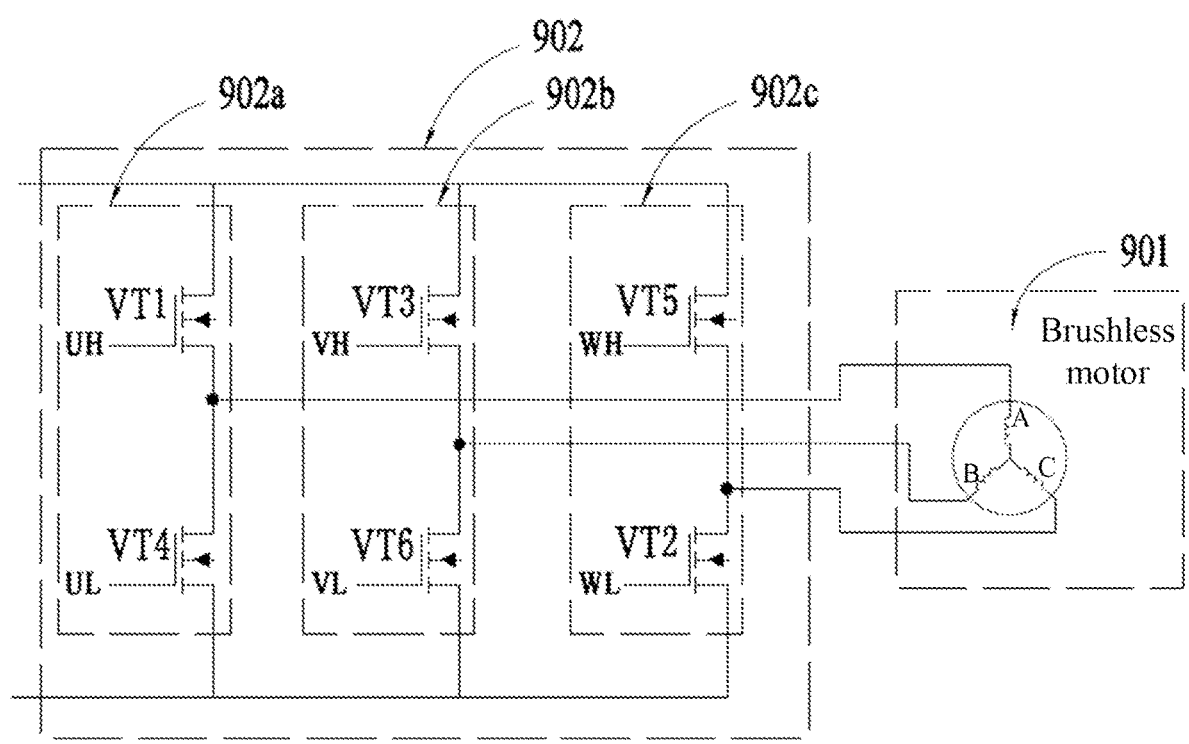
FIG. 10 is a schematic diagram of a drive circuit of FIG. 9.

Referring to FIG. 10, as an example, the drive circuit 902 includes switch elements VT1, VT2, VT3, VT4, VT5, and VT6, the switch elements VT1, VT2, VT3, VT4, VT5, and VT6 form a three-phase bridge circuit, and the bridge arms are the first bridge arm 902a, the second bridge arm 902b, and the third bridge arm 903c, respectively, where VT1, VT3, and VT5 are upper bridge arm switch elements, and VT2, VT4, and VT6 are lower bridge arm switch elements. Field effect transistors, IGBT transistors and the like may be selected as the switch elements VT1 to VT6. For a field effect transistor, the gate terminal of each switch element is electrically connected to a control signal output terminal of the controller 903, and the drain or source of each switch element is electrically connected to the windings of the brushless motor 901. The switch elements VT1 to VT6 change the on state according to the control signal output by the controller 903, turn on the winding circuit with a certain duty ratio, and change the voltage state loaded on the windings of the brushless motor 17 so that a current flows through the corresponding winding, and thus the brushless motor 901 is driven to operate. It is to be noted that the control signal of the controller 903 may control the current or voltage of the brushless motor by controlling the duty ratio of the switch elements VT1 to VT6, thereby controlling the rotation speed of the brushless motor 901.

To make the brushless motor 901 rotate, the drive circuit 902 has multiple drive states. In one drive state, the stator windings of the brushless motor 901 generate one magnetic field. In the related art, the controller 903 is configured to output, according to the rotation position of the rotor of the brushless motor 901, a corresponding control signal to the drive circuit 902 to make the drive circuit 902 switch the drive states. In this manner, the state of the voltage loaded on the windings of the brushless motor 901 is changed, and an alternating magnetic field is generated to drive the rotor to rotate so that the brushless motor 17 may be driven.

The controller 903 is electrically connected to the drive circuit 902 to output a control signal to control the operation of the drive circuit 902. In some examples, the controller 903 includes a dedicated control chip (for example, a microcontroller unit (MCU)). The controller 903 may control the circuit state of the entire machine and achieve various electronic functions such as soft start of the motor and electronic brake.

The power supply circuit 904 is mainly configured to adjust the voltage from the power supply 905 to enable the controller 903 to obtain an appropriate power supply. The power supply 905 is mainly configured to power the entire grass trimmer 100. As one of the solutions, the power supply 905 is a battery pack 170 that is able to be charged repeatedly.

Optionally, a physical switch 906 may be disposed between the controller 903 and the power supply circuit 904, and the physical switch 906 may be controlled by the user to turn on or off the electrical connection between the controller 903 and the power supply circuit 904 so that the controller 903 cannot drive the brushless motor 901.

The physical switch 906 may serve as the main control switch of the grass trimmer 100 for the user to operate to control whether the brushless motor 901 is activated. In some examples, the physical switch 906 may be associated with the operation device 130, and specifically, the physical switch 906 may be associated with one of the operation pieces of the operation device 130. As an example, the physical switch 906 may be associated with the first operation piece 131 of the operation device 130 and may be triggered by the first operation piece 131. In the case where the user operates the first operation piece 131, the physical switch 906 may be triggered to be turned on or off. As an example, in the case where the first operation piece 131 is operated and is in the first preset operation state, the physical switch 906 is triggered to be turned on, and the electrical connection between the controller 903 and the power supply circuit 904 is achieved. In this case, the grass trimmer 100 is in the cutting mode, and the controller outputs a control signal to enable the brushless motor 901 to rotate in the forward direction at a relatively high rotation speed so that the grass trimmer operation is performed.

The grass trimmer 100 further includes a control switch for making the controller 903 to be in a first control mode or a second control mode. Optionally, the control switch is a signal switch 907. In the case where the user operates the signal switch 907, the signal switch 907 may send different signals, and the controller 903 may output different control modes according to the signal sent by the signal switch 907 so that the brushless motor 901 has different rotation states. Therefore, the signal switch 907 may serve as an operation piece for the user to perform mode selection so that the user may select the cutting mode or the automatic winding mode.

In the cutting mode, the spool 111 and the head housing 112 rotate synchronously. In the cutting mode, the controller 903 controls the drive circuit 902 in the first control mode to enable the brushless motor 901 to operate at the first rotation speed. In the automatic winding mode, the controller 903 controls the drive circuit 902 in the second control mode different from the first control mode to enable the brushless motor 901 to operate at the second rotation speed less than the first rotation speed. In the cutting mode, the controller 903 enables the brushless motor 901 to rotate in the first direction; in the automatic winding mode, the controller 903 enables the brushless motor 901 to rotate in the second direction opposite to the first direction.

In the case where the user selects the cutting mode, the signal switch 907 sends a first signal; in this case, the user controls the physical switch 906 to energize the controller 903, and the controller 903 is in the first control mode according to the received first signal and outputs a control signal to the drive circuit 902 so that the brushless motor 901 rotates in the forward direction at a relatively high first rotation speed. In the case where the user selects the automatic winding mode, the signal switch 907 sends a second signal different from the first signal; the controller 903 is in the second control mode according to the second signal and outputs a control signal to enable the brushless motor 901 to rotate in the reverse direction at a relatively low second rotation speed, and the grass trimmer 100 enters the automatic winding mode to perform the automatic winding.

In some examples, the signal switch 907 may be associated with the operation device 130 and triggered by the operation device 130. Specifically, the signal switch 907 may be associated with the second operation piece 132 of the operation device 130. In the case where the user operates the second operation piece 132, the signal switch 907 may be triggered and the signal switch 907 outputs the first signal or the second signal. As an example, in the case where the second operation piece 132 is not operated and is in the initial state, the signal switch 907 outputs the first signal; and in the case where the second operation piece 132 is operated and is in the second preset operation state, the signal switch 907 is triggered to output the second signal, and the controller 903 is in the second control mode according to the second signal and outputs a control signal to enable the brushless motor 901 to rotate in the reverse direction at a relatively low rotation speed so that the grass trimmer 100 enters the automatic winding mode.

Of course, a solution in which two physical switches or two signal switches may be adopted, the two physical switches or two signal switches may achieve the mode switching and the control of the start of the brushless motor 901, respectively.

The control of the speed may be achieved by changing the duty ratios of the control signals output to the drive circuit 902 by the controller 903 in the first control mode and the second control mode. In the first control mode, the controller 903 may output a control signal with a relatively high duty ratio to enable the brushless motor 901 to have a relatively high first rotation speed; in this case, the grass trimmer 100 is in the cutting mode to perform the grass trimmer operation. In the second control mode, the controller 903 outputs a control signal with a relatively low duty ratio to enable the brushless motor 901 to have a relatively low second rotation speed; in this case, the grass trimmer 100 is in the automatic winding mode to perform the automatic winding operation.

As an example, the value range of the ratio of the first rotation speed to the second rotation speed is greater than or equal to 10 and less than or equal to 100. For example, the first rotation speed is 5800 rpm, the second rotation speed is 100 rpm, and the direction of the second rotation speed is opposite to the direction of the first rotation speed.

Moreover, to achieve the automatic stop of the winding, the grass trimmer 100 further includes a detection device 908. The detection device 908 is configured to detect a current of the brushless motor 901. In the case where the winding ends, the grass trimmer rope 101 is tightened, and the current of the brushless motor 901 suddenly increases. The controller 903 may determine whether the grass trimmer rope 101 is tightened according to a current threshold or a threshold of a current slope so as to stop the brushless motor 901 in the automatic winding mode.

Moreover, with the winding of the grass trimmer rope 101, the load of the brushless motor 901 increases due to the increase in the mass of the grass trimmer rope 101 so that the current of the brushless motor 901 increases. Therefore, one current threshold may further be set to determine whether the winding is completed. Similarly, due to the increase in load, the rotation speed of the brushless motor 901 also decreases. Therefore, one threshold of the rotation speed or one threshold of the rotation speed slope may also be set as the criterion of whether the winding is completed. In the case where the rotation speed drops relatively fast or the rotation speed drops to a certain level, the controller 903 determines that the automatic winding is completed.

Alternatively, a position sensor or optical sensor may also be used to determine the position and status of the grass trimmer rope so that the automatic winding mode is completed.

Moreover, according to the same principle, to prevent the user from accidentally starting the automatic winding mode when the grass trimmer rope 101 is still stored in the grass trimmer head, the controller 903 may start the automatic winding mode in the reverse direction. In this case, if the load is relatively great such as a relatively great current or a relatively low speed, the controller 903 determines that the current situation is not suitable for operating the automatic winding mode, and then the brushless motor 901 is stopped to be driven, and the user is prompted by sound or light signals.

To sum up, the controller 903 may determine the load condition of the brushless motor 901 according to the rotation speed or current of the brushless motor 901 so as to determine when the winding ends and whether it is currently suitable for the automatic winding.

In the related art, the brushless motor 901 usually further includes a position measurement and calculation unit for detecting or estimating the position of the rotor of the brushless motor 901. The controller 903 outputs, according to the position of the rotor, a corresponding control signal to the drive circuit 902. In this manner, the turned-on switch elements and the turned-on windings are changed so that the direction of the magnetic field is changed and the rotor is driven to rotate continuously. This kind of control manner is to control the conducting windings according to the position of the rotor, thereby changing the direction of the magnetic field and driving the rotor to rotate continuously.

In the present application, the brushless motor 901 operates in the reverse direction at a low speed in the automatic winding mode of the grass trimmer 100, and the torque generated by the brushless motor 901 must be sufficient to make the grass trimmer rope 100 automatically wound onto the spool 111.

In the grass trimmer 100 of the present application, since at least one of the head housing 112 and the spool 111 rotates around the central axis 110a, the spool 111 is formed with the first inclined surface 111h, and the head housing 112 is formed with the second inclined surface 112j, and the first inclined surface 111h and the second inclined surfaces 112j are inclined to the normal plane of the central axis 110a. In the automatic winding mode, the first inclined surface 111h and the second inclined surface 112j contact each other and slide relatively so that the spool 111 and the head housing 112 rotate relatively.

That is, the transmission surfaces between the spool 111 and the head housing 112 is designed as inclined surfaces. The inclined surfaces enable the spool 111 and the head housing 112 to only be transmitted in one direction, that is, in the cutting mode, in the case where the brushless motor 901 rotates along the first direction, the spool 111 and the head housing 112 may rotate synchronously; and in the automatic winding mode, in the case where the brushless motor 901 rotates along the second direction opposite to the first direction, since sliding occurs between the inclined surfaces, the spool 111 and the head housing 112 may rotate relatively.

The spool 111 is formed with multiple first meshing teeth 111a arranged circumferentially around the central axis 110a; the head housing 112 is formed with multiple first engaging teeth 112f engaged with the multiple first meshing teeth 111a; the first meshing teeth 111a are formed with the first inclined surface 111h, the first engaging teeth 112f are formed with the second inclined surface 112j, and the first inclined surface 111h and the second inclined surface 112j are inclined to the normal plane of the central axis 110a.

In this manner, due to the arrangement of the inclined surfaces, the first meshing teeth 111a and the first engaging teeth 112f may only be transmitted in one direction, and in the case where the first meshing teeth 111a and the first engaging teeth 112f rotate relatively in opposite directions, sliding occurs due to the inclined surfaces so that in the automatic winding mode, the resistance to the rotation of the spool 111 relative to the head housing 112 is in a fluctuating state, that is, in the automatic winding mode, the resistance to the rotation of the spool 111 relative to the head housing 112 varies. Specifically, the varying resistances fluctuate periodically. Therefore, the load of the motor fluctuates greatly.

When the spool 111 rotates relative to the head housing 112, in the case where the first engaging teeth 112f reach the highest point of the inclined surface of the first meshing teeth 111a, the resistance to the rotation of the spool 111 relative to the head housing 112 is the maximum; and in the case where the first engaging teeth 112f pass across the highest point of the inclined surface of the first meshing teeth 111a to the lowest point, the resistance to the rotation of the spool 111 relative to the head housing 112 suddenly decreases to the minimum.

If the preceding control method of the brushless motor in the related art (changing the turned-on switch according to the position of the rotor, thereby changing the turned-on windings to change the direction of the magnetic field so that the rotor may maintain continuous rotation) is applied to the automatic winding mode of the grass trimmer 100, in the case where the resistance to the rotation of the spool 111 relative to the head housing 112 is the maximum, the load current increases, and the rotation speed of the rotor increases; and in the case where the spool 111 passes across the point of maximum resistance, the resistance to the rotation of the spool 111 relative to the head housing 112 suddenly decreases, the load current decreases, and the rotation speed of the rotor decreases again. In this manner, in the automatic winding mode of the grass trimmer 100, the load fluctuates greatly, and the rotation speed of the rotor fluctuates greatly so that the brushless motor 901, the spool 111, and the head housing 112 may be damaged, leading to an unstable winding speed and an unsmooth winding process, which is not conducive to winding and may damage the motor, the spool, and the head housing.

However, the grass trimmer 100 of the present application can achieve the control effect of stable low speed and high torque of the motor in the automatic winding mode, and the winding speed is more stable.

In the automatic winding mode of the grass trimmer 100 of the present application, the controller 903 outputs a control signal according to at least one of a given voltage and a given current to control the drive circuit 902 to enable the motor 121 to operate at a basically constant rotation speed, and the motor 121 drives at least one of the spool 111 and the head housing 112 to enable the spool 111 and the head housing 121 to rotate relatively so that the grass trimmer rope 101 is automatically wound onto the spool 111. Specifically, the motor 121 is the brushless motor 901. During the automatic winding process, the resistance to the automatic winding may be different in different periods such as early period, middle period and later period of the automatic winding, due to the uneven material of the grass trimmer rope. Therefore, minor changes of the rotation speed of the brushless motor 901 may occur. Therefore, in the application, in the case where the change in the rotation speed of the brushless motor 901 is within 10%, it is considered that the rotation speed of the brushless motor 901 is basically constant.

In the automatic winding mode, in the case where the motor 121 drives at least one of the spool 111 and the head housing 112 at a basically constant rotation speed, the spool 111 and the head housing 112 are subjected to varying resistances, and at least one of the given voltage and the given current may enable the controller 903 to output a control signal so that at least one of the spool 111 and the head housing 112 overcomes a resistance with a maximum resistance value among the varying resistances.

As mentioned above, in this example, the grass trimmer 100 is in the automatic winding mode, the motor 121 drives the spool 111 to rotate, the resistance to the rotation of the spool 111 relative to the head housing 112 varies, the resistance to the rotation of the spool 111 relative to the head housing 112 fluctuates, and the amplitude or magnitude of at least one of the given voltage and the given current enables the controller 903 to output a control signal so that the spool 111 overcomes the maximum resistance among the varying resistances.

In some other examples, in the automatic winding mode, the motor 121 drives the head housing 112 to rotate, the resistance to the relative rotation of the head housing 112 and the spool 111 varies, and the amplitude of at least one of the given voltage and the given current enables the controller 903 to output a control signal so that the head housing 112 overcomes the maximum resistance among the varying resistances. In some other examples, the motor 121 drives the head housing 112 and the spool 111 to rotate, and a speed difference between the rotation speed of the head housing 112 and the rotation speed of the spool 111 exists so that the head housing 112 and the spool 111 rotate relatively. The resistance to the relative rotation of the head housing 112 and the spool 111 varies, and the amplitude of at least one of the given voltage and the given current enables the controller 903 to output a control signal so that at least one of the spool 111 and the head housing 112 overcomes the maximum resistance among the varying resistances.

The controller 903 outputs a control signal according to at least one of the given voltage and the given current to control the drive circuit 902 to generate a rotating magnetic field in the brushless motor 901, the rotating magnetic field may drive the rotor to rotate, and the rotor rotates synchronously with the rotating magnetic field. In this manner, at least one of the spool 111 and the head housing 112 driven by the rotor rotates synchronously with the rotating magnetic field, and the rotating magnetic field operates at a basically constant speed so that the motor 121 operates at a basically constant speed, at least one of the spool 111 and the head housing 112 rotates at a basically constant speed, the speed at which the grass trimmer rope 101 is automatically wound onto the spool 111 is also basically constant, and the winding speed is more stable.

As an example, in the automatic winding mode of the grass trimmer 100, the motor 121 drives the spool 111 to rotate relative to the head housing 112, the controller 903 outputs a control signal according to the given voltage to control the drive circuit 902 to enable the brushless motor 901 to operate at a basically constant speed, and the amplitude of the given voltage enables the controller 903 to output a control signal so that the spool 111 overcomes the maximum resistance among the varying resistances when the spool 111 rotates relative to the head housing 112.

Figure 11:
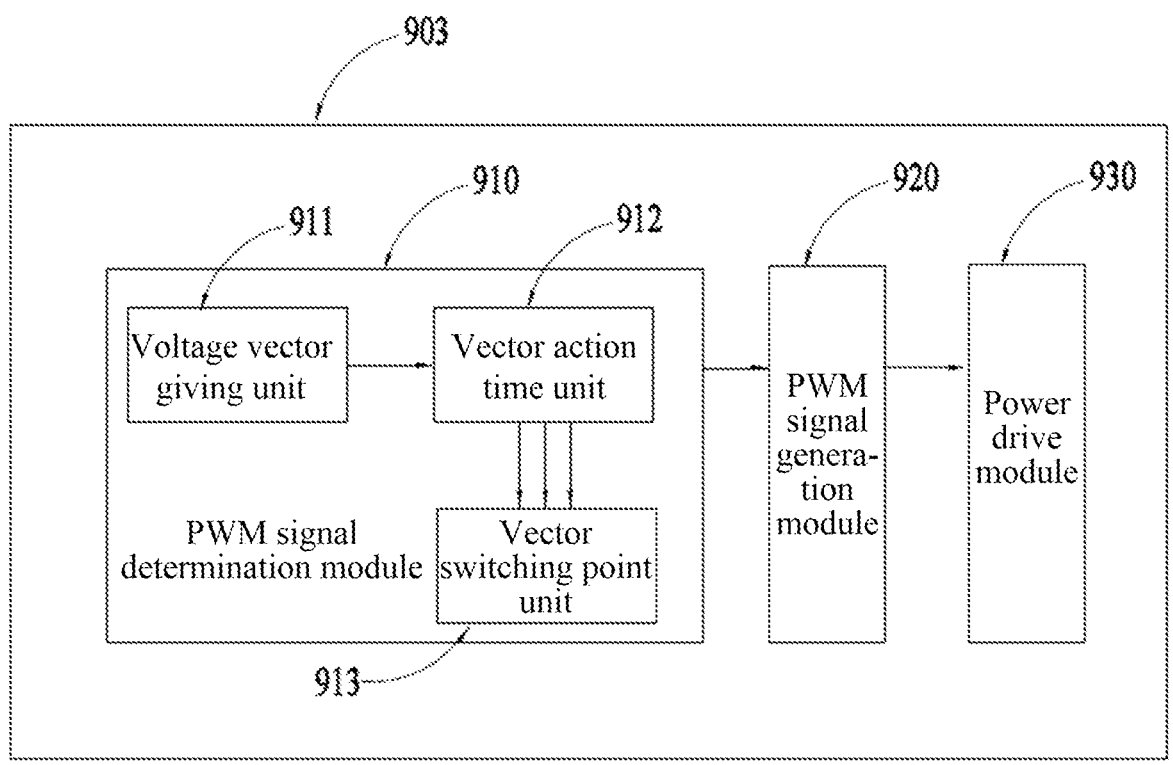
FIG. 11 is an internal block diagram of a controller of FIG. 9.

Referring to FIG. 11, as an example, the grass trimmer 100 further includes a PWM signal determination module 910, the PWM signal determination module 910 is disposed in the controller 903, and the PWM signal determination module 910 is configured to calculate and determine, according to the given voltage, a PWM signal output by the controller 903 so that the spool 111 overcomes the maximum resistance among the varying resistances. That is, the PWM signal determination module 910 is configured to generate the PWM signal of a target rotating magnetic field that drives the rotor to rotate. Specifically, the pulse width and switching point of the PWM signal are determined.

The controller 903 further includes a PWM signal generation module 920, the input terminal of the PWM signal generation module 920 is connected to the output terminal of the PWM signal determination module 910, and the PWM signal generation module 920 is connected to the drive circuit 902. The PWM signal generation module 920 is configured to generate the PWM signal according to the PWM signal determined by the PWM signal determination module 910 to control the drive circuit 902 so that the turned-on windings generate a target rotating magnetic field, and the target rotating magnetic field drives the rotor to rotate.

Optionally, the controller 903 further includes a power drive module 930. The PWM signal generation module 920 is connected to the drive circuit 902 through the power drive module 930. The power drive module 930 is configured to amplify the PWM signal of the PWM signal generation module so that the switch elements of the drive circuit 902 is driven to be turned on.

In this example, the PWM signal determination module 910 includes a voltage vector giving unit 911, a vector action time unit 912, and a vector switching point unit 913. The voltage vector giving unit 911 is configured to give a target voltage vector that the PWM signal determination module 910 needs to synthesize. The input terminal of the vector action time unit 912 is connected to the voltage vector giving unit 911, and the output terminal of the vector action time unit 912 is connected to the vector switching point unit 913. The vector action time unit 912 determines, according to the target voltage vector given by the voltage vector giving unit 911, action time of a basic voltage vector and a zero vector that synthesize the target voltage vector. The vector switching point unit 913 is connected to the vector action time unit 912 and is configured to determine a time point at which the PWM signal needs to be switched according to the action time of the basic voltage vector and the zero vector output by the vector action time unit 912, and the vector switching point unit 913 includes a timer.

The PWM signal generation module 920 generates the corresponding PWM signal according to the PWM signal determined by the PWM signal determination module 91 that generates the target rotating magnetic field that drives the rotor to rotate. The PWM signal is configured to control the switch elements of the drive circuit 902 to turn on the corresponding windings so that a target magnetic field corresponding to the target voltage vector is generated. The target voltage vector given by the voltage vector giving unit 911 is a rotating vector in a counterclockwise or clockwise direction, and the corresponding target magnetic field is a rotating magnetic field in a counterclockwise or clockwise direction. The rotation direction of the rotating magnetic field is related to the rotation direction of the brushless motor 901 in the automatic winding mode.

In this example, in the cutting mode of the grass trimmer 100, if the brushless motor 901 rotates in the forward direction and the rotor rotates in the clockwise direction, then in the automatic winding mode, the brushless motors 901 rotate in the reverse direction, the rotor rotates in the counterclockwise direction, and the target magnetic field is a rotating magnetic field rotating in the counterclockwise direction.

The magnitude of the target voltage vector given by the voltage vector giving unit 911 is sufficient to overcome the maximum resistance to the rotation of the spool 111 relative to the head housing 112. The rotating magnetic field generated by the windings may drive the rotor to rotate continuously at a constant rotation speed. In this manner, the winding speed of the spool 111 is stable, and the following problem is avoided: in the automatic winding mode, the load fluctuates greatly so that the brushless motor 901, the spool 111, and the head housing 112 are damaged, the winding speed is unstable, and the winding process is not smooth, which is not conducive to winding.

In this example, the winding speed of the spool 111 is synchronized with the rotation speed of the rotating magnetic field generated by the windings, and the rotation speeds of the two are equal or basically equal. The magnitude of the target voltage vector given by the voltage vector giving unit 911 is related to the power supply voltage of the power supply of the grass trimmer 100.

As an example, the value range of the ratio of the given voltage to the power supply voltage is 0.1 to 0.5. The value range of the ratio of the amplitude of the target voltage vector to the amplitude of the power supply voltage is 0.1 to 0.5. In this example, the battery pack 170 is used as the power supply. For example, the case where the battery pack 170 serves as the power source, the amplitude of the target voltage vector is 10% to 50% of the rated voltage of the battery pack 170. For example, if the rated voltage of the battery pack 170 is 56 V, the amplitude of the target voltage vector may be 11 V. In the actual operation, the amplitude of the target voltage vector may be achieved by setting the duty ratio of the PWM signal.

The principle of the PWM signal determination module 910 will be described in detail below. Referring to the voltage space vector diagram shown in FIG. 12, for ease of description, the concept of sectors is introduced, and the entire plane is divided into six sectors. Each sector includes two basic voltage vectors $u_i$. The target voltage vector $U_s$ given by the voltage vector giving unit 911 is in a certain sector and is synthesized by two basic voltage vectors $u_i$ at the boundary of the sector. The basic voltage vector $u_i$ is the voltage vector of the windings, and the adjacent basic voltage vectors $u_i$ are different by 60°.

The target voltage vector $U_S$ given by the voltage vector giving unit 911 is a rotating vector in the counterclockwise or clockwise direction, and the corresponding target magnetic field is a rotating magnetic field in the counterclockwise or clockwise direction. The amplitude of the target voltage vector $U_s$ is obtained by trial and error, and the value of the amplitude of the target voltage vector $U_s$ should be selected such that the spool 111 overcomes the maximum resistance to maintain a basically constant rotation speed and rotate continuously when the spool 111 rotates relative to the head housing 112.

Since two of the windings of the brushless motor 901 are distributed and different by 120° in space, the target voltage vector may be defined as:

$$U_S = k\left(U_{sA} + U_{sB}e^{j\frac{2\pi}{3}} + U_{sC}e^{j\frac{4\pi}{3}}\right) \tag{1}$$

In view of different transformations, k may be different values. If the power is constant, the amplitude of the voltage and the amplitude of the current are constant. To make the projection of the synthesized voltage space vector on the stationary three-phase coordinate axis equal to the vector component of the synthesized voltage space vector, the value of k is ⅔, then the target voltage vector $U_S$ may be expressed as the formula described below.

$$U_S = \frac{2}{3}\left(U_{sA} + U_{sB}e^{j\frac{2\pi}{3}} + U_{sC}e^{j\frac{4\pi}{3}}\right) \tag{2}$$

The drive circuit 902 in FIG. 10 is used as an example. Six switch elements of three bridge arms that are the first bridge arm 902a, the second bridge arm 902b, and the third bridge arm 902c may form a total of eight switching modes. The states of the bridge arms are marked with $S_A$, $S_B$, and $S_C$. It is stipulated that when the upper bridge arm switch elements (VT1, VT3, and VT5) of each bridge arm is turned on, the bridge arm state is 1; and when the lower bridge arm switch elements (VT4, VT6, VT2) is turned on, the bridge arm state is 0. In this manner, the drive circuit 902 has eight switching modes. Among the eight switching modes, six switching modes correspond to non-zero voltage space vectors $u_1$ to $u_6$. The amplitudes of the vectors are $$\frac{2}{3}U_d.$$

The vectors are different from each other by 60° in space. $U_d$ is the DC-side voltage. For the battery pack power supply, $U_d$ is the voltage of the battery pack. The amplitudes of voltage vectors $u_0$ and $u_7$ corresponding to two switching modes are zero, and $u_0$ and $u_7$ are referred to as zero vectors. In the case where the zero vector acts on the motor, no flux linkage vector is formed; in the case where a non-zero vector acts on the motor, the corresponding flux linkage vector is formed in the motor.

The switch state $(S_A, S_B, S_C)=(1, 0, 0)$ is used as an example, that is, the switch elements VT1, VT2, and VT3 are turned on and the rest are turned off. The state of each phase winding changes to the form of parallel connection of phase B and phase C and then series connection with phase A, and the phase voltage is easily obtained, which is described below.

$$U_{sA} = \frac{2}{3}U_d, \ U_{sB} = -\frac{1}{3}U_d, \ U_{sC} = -\frac{1}{3}U_d \tag{3}$$

The above three formulas are put into the formula $$U_S = \frac{2}{3}\left(U_{sA} + U_{sB}e^{j\frac{2\pi}{3}} + U_{sC}e^{j\frac{4\pi}{3}}\right) \tag{4}$$

and then the target voltage vector $U_s$ may be obtained, which is $$\frac{2}{3}U_d e^{j0}.$$

The basic voltage vector $u_i$ corresponding to different switch states may be obtained by the same method and the expressions are described in Table 1.

TABLE 1

| Basic Voltage Space Vector Symbol | Switch State $S_A S_B S_C$ | Phase Voltage Phase A | Phase B | Phase C | Basic Voltage Vector Expression |
|---|---|---|---|---|---|
| $u_0$ | 000 | 0 | 0 | 0 | 0 |
| $u_1$ | 001 | $-\frac{1}{3}U_d$ | $-\frac{1}{3}U_d$ | $\frac{2}{3}U_d$ | $\frac{2}{3}U_d e^{j\frac{4}{3}\pi}$ |
| $u_2$ | 010 | $-\frac{1}{3}U_d$ | $\frac{2}{3}U_d$ | $-\frac{1}{3}U_d$ | $\frac{2}{3}U_d e^{j\frac{2}{3}\pi}$ |
| $u_3$ | 011 | $-\frac{2}{3}U_d$ | $\frac{1}{3}U_d$ | $\frac{1}{3}U_d$ | $\frac{2}{3}U_d e^{j\pi}$ |
| $u_4$ | 100 | $\frac{2}{3}U_d$ | $-\frac{1}{3}U_d$ | $-\frac{1}{3}U_d$ | $\frac{2}{3}U_d e^{j0}$ |
| $u_5$ | 101 | $\frac{1}{3}U_d$ | $-\frac{2}{3}U_d$ | $\frac{1}{3}U_d$ | $\frac{2}{3}U_d e^{j\frac{5}{3}\pi}$ |
| $u_6$ | 110 | $\frac{1}{3}U_d$ | $\frac{1}{3}U_d$ | $-\frac{2}{3}U_d$ | $\frac{2}{3}U_d e^{j\frac{1}{3}\pi}$ |
| $u_7$ | 111 | 0 | 0 | 0 | 0 |

The vector action time unit 912 is configured to calculate and obtain the action time of the basic voltage vector and the zero vector according to the target voltage vector given by the voltage vector giving unit 911. With continued reference to FIG. 12, it is assumed that the target voltage vector $U_s$ is located in sector III. The basic voltage vectors $u_4$, $u_6$, $u_0$, and $u_7$ are used for synthesis. In the two-phase static reference coordinate system (α, β), the angle between $U_S$ and $u_4$ is 0. Through the volt second principle and the low of sines, the formulas described below are obtained.

$$\alpha \text{ axis: } u_\alpha T = T_4\left|U_4\right| + T_6\left|U_6\right|\cos\frac{\pi}{3} \tag{5}$$

$$\beta \text{ axis: } u_\beta T = T_6\left|U_6\right|\sin\frac{\pi}{3} \tag{6}$$

$T_i$ is action time of the corresponding basic voltage vector $u_i$ (i=0~7), T is the sampling period and is usually the modulation period of PWM, $$|u_4| = |u_6| = \frac{2}{3}U_d,$$

the above two formulas are solved, and then $u_4$ and $u_6$ are obtained. The action times of the two basic voltage vectors $u_4$ and $u_6$ may be calculated by the formula described below.

$$\begin{cases} T_6 = \dfrac{\sqrt{3}\, u_\beta T}{U_d} \\ T_4 = \dfrac{\sqrt{3}\, T}{2U_d}(\sqrt{3}\, u_\alpha - u_\beta) \end{cases} \quad (7)$$

$u_\alpha = |U_s|\cos\theta$, $u_\beta = |U_s|\sin\theta$, the action time of the basic voltage vectors $u_i$ that synthesize the target voltage vector $U_S$ may be determined through the preceding method. In the case where the target voltage vector $U_S$ that needs to be synthesized is located in different sectors, the preceding calculations are followed.

The action time of the basic voltage vector $u_i$ in each sector is solved, and it is not difficult to find that the vectors are all combinations of basic time. Therefore, several basic time variables X, Y, are Z are defined.

$$X = \frac{\sqrt{3}\, u_\beta \times T}{U_d}, \quad (8)$$

$$Y = \frac{\left(\dfrac{\sqrt{3}}{2} u_\beta + \dfrac{3}{2} u_\alpha\right) \times T}{U_d},$$

$$Z = \frac{\left(\dfrac{\sqrt{3}}{2} u_\beta - \dfrac{3}{2} u_\alpha\right) \times T}{U_d}$$

Through calculation, the action time of the basic voltage vector $u_i$ in each sector may be obtained. It is assumed that the action times of two basic voltage vectors $u_i$ in each sector are $T_1$ and $T_2$. Therefore, Table 2 describing the action times of the basic voltage vectors $u_i$ may be obtained below. The vector action time unit 912 determines the action time of the basic voltage vector and the zero vector.

TABLE 2

| Sector | I | II | III | IV | V | VI |
| --- | --- | --- | --- | --- | --- | --- |
| $T_1$ | Y | −X | −Z | Z | X | −Y |
| $T_2$ | Z | Y | X | −X | −Y | −Z |

The brushless motor 901 works according to the control signal modulated by the PWM signal determination module 910. The working principle is that in the case where the drive circuit 902 outputs a certain basic voltage vector $u_i$ according to the control signal modulated by the PWM signal determination module, the flux linkage space vector $\psi_s$ is formed, and $\psi_s$ may be expressed as the formula described below.

$$\psi_s = \psi_{s0} + u_i \times \Delta t \quad (9)$$

$\psi_{s0}$ is the initial flux linkage space vector; and $\Delta t$ is the action time of $U_i$. In the case where $u_i$ is one certain non-zero voltage vector ($u_1$ to $u_6$), the flux linkage space vector starts from the initial position along the direction of the corresponding target voltage vector $U_S$ and rotates with a radius of $$\sqrt{\frac{2}{3}} \frac{U_L}{\omega_s}.$$

In the case where $u_i$ is one zero voltage vector ($u_0$ and $u_7$), $\psi_s = \psi_{s0}$, and the movement of the flux linkage space vector is suppressed. Therefore, the application order and action time of six non-zero vectors ($u_1$ to $u_6$) may be selected reasonably, the flux linkage space vector rotate clockwise or counterclockwise so that a flux linkage track of a certain shape is formed. In the motor control, the flux linkage track is made to be close to a regular polygon or circle. At the same time, according to a certain principle such as the minimum number of switches, one or more zero vectors are inserted between two non-zero vectors ($u_0$ and $u_7$) and the action time of the zero vectors are reasonably selected so that the movement speed of $\psi_s$ is may be adjusted, the speed of the rotating magnetic field may be adjusted, and thus the spool 111 is driven to rotate relative to the head housing 112 for winding. If in the cutting mode, the rotor of the brushless motor 901 rotates clockwise at a high speed, then in the automatic winding mode, the rotor of the brushless motor 901 rotates counterclockwise at a low speed, and the flux linkage space vector $\psi_s$ is controlled correspondingly to rotate counterclockwise through the modulated PWM.

In the actual operation, the basic voltage vector $u_i$ that synthesizes the target voltage vector $U_s$ may also be directly given, and the basic voltage vector $u_i$ may synthesize the required target voltage vector $U_s$. The given basic voltage vector $u_i$ may be characterized by the on-time or duty ratio of the corresponding winding in one cycle.

As an example, in each PWM modulation cycle, there are five switch states $S_A$, $S_B$, and $S_C$, which are symmetrical about the cycle center. The zero vectors $u_0$ and $u_7$ needs to be inserted in the middle of the PWM cycle, and which one of $u_0$ and $u_7$ to use is determined according to the rotation direction and the principle of the minimum number of switching actions. For example, in the sector III, if the direction of rotation is counterclockwise, $u_4$ first acts, then $u_6$ acts, and so on, the data in Table 2 may be directly used as the action time, and then the zero vector is used to minimize the number of switches.

Figure 14A:
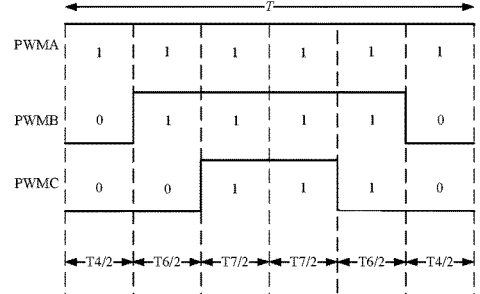
FIGS. 14A and 14B together are a schematic diagram of the actions of switch elements of a drive circuit in each sector generated by a PWM signal generation module and labeled as Table 4.
Figure 14A:
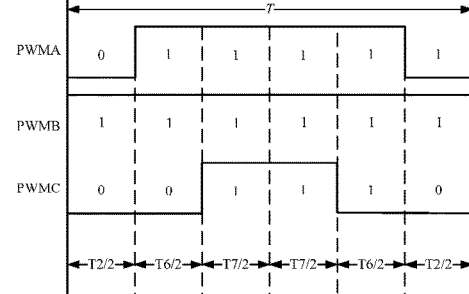
Figure 14A:
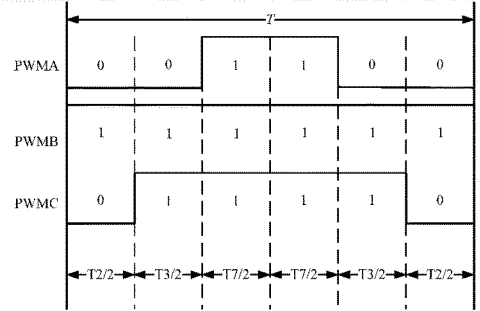
Figure 14B:
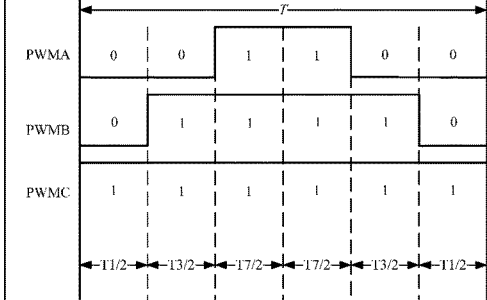
Figure 14B:
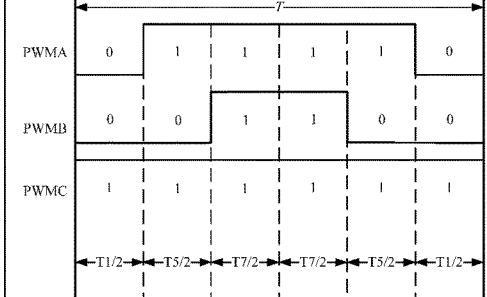
Figure 14B:
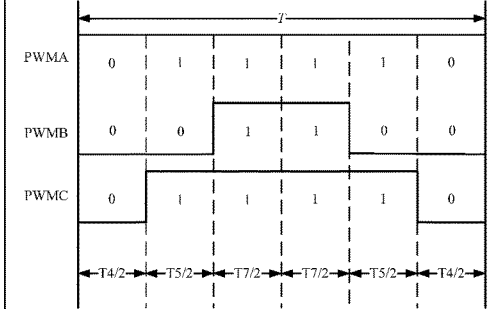

The action time of the zero vector may be expressed as $T_0/T_7 = T_1 - T_1 - T_2$. According to the preceding configuration principle, the schematic diagram of the actions of the switch elements of the drive circuit 902 in each sector generated by the PWM signal generation module 920 is described in Table 4 (FIGS. 14A and 14B).

The controller 903 further includes the vector switching point unit 913. The vector switching point unit 913 includes a timer. The timer is set to a continuous up/down counting mode, and the timer is configured to time the action time of the calculated basic voltage vector and the zero vector to determine the vector switching point. The vector switching point corresponds to the switching point of the PWM signal.

The present application further discloses a control method of the grass trimmer 100. The grass trimmer 100 includes the preceding grass trimmer head 110, the brushless motor 901 configured to drive the grass trimmer head 110, the drive circuit 902 configured to drive the brushless motor 901, and the controller 903 configured to control the drive circuit.

The control method of the grass trimmer 100 includes: in the automatic winding mode, outputting a control signal to the drive circuit 902 according to at least one of a given voltage and a given current so that the rotation speed of the brushless motor 901 is basically constant.

The grass trimmer head 110 includes a spool 111 and a head housing 112. The spool 111 is configured to wind the grass trimmer rope 101. The head housing 112 is configured to accommodate the spool 111. In the automatic winding mode, the spool 111 and the head housing 112 are subjected to varying resistances. At least one of the given voltage and the given current enables at least one of the spool 111 and the head housing 112 to overcome the resistance with the maximum resistance value among the varying resistances.

Figure 13:
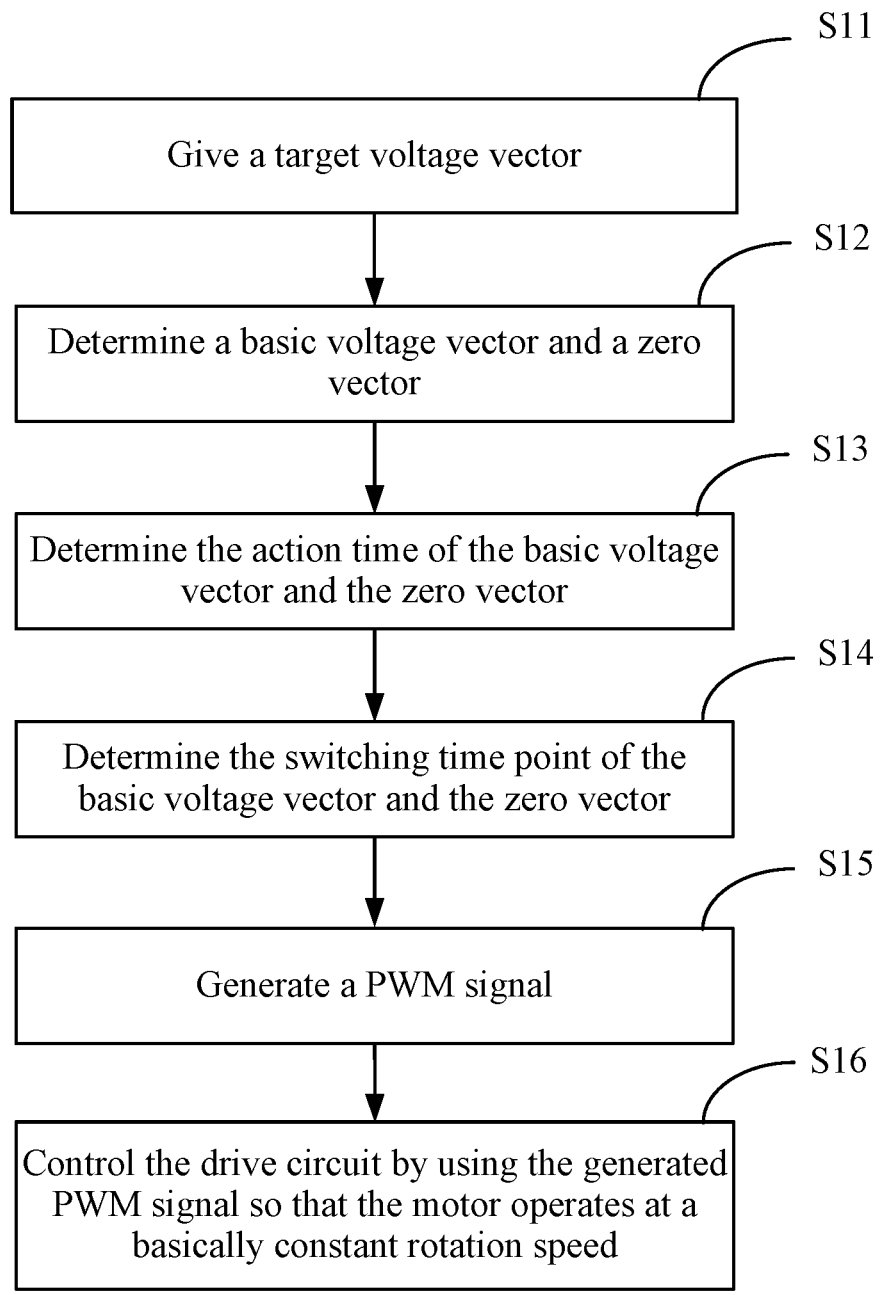
FIG. 13 is a flowchart of a control method of the grass trimmer according to an example.

Referring to FIG. 13, specifically, the control method of the grass trimmer 100 includes the steps described below.

In step S11, a target voltage vector is given.

Before the target voltage vector is given, the maximum resistance encountered by at least one of the spool 111 and the head housing 112 when the spool 111 and the head housing 112 rotate relatively needs to be determined so that the maximum resistance that needs to be overcome is determined, and the maximum resistance may be obtained through the experiment. After the maximum resistance is determined, the given target voltage vector may be determined. The amplitude of the target voltage vector $U_s$ is equal to the amplitude of the given voltage, and the target voltage vector $U_s$ enables the controller 903 to output a control signal so that at least one of the spool 111 and the head housing 112 overcomes the maximum resistance, and thus in the automatic winding mode, the rotation speed of the brushless motor 901 is constant and the winding speed is stable. The given target voltage vector $U_s$ may be stored in a memory in advance, and the voltage vector giving unit 911 serves as the memory and stores the given target voltage vector $U_s$.

In step S12, the basic voltage vector and the zero vector for synthesizing the target voltage vector are determined.

After the target voltage vector $U_s$ is determined, the position of the sector where the target voltage vector $U_s$ is located may be determined so that two basic voltage vectors $u_i$ located at the boundary of the sector may be obtained. In this manner, the basic voltage vectors and the zero vector that synthesize the target voltage vector $U_s$ may be obtained. The two basic voltage vectors $u_i$ and the zero vector may also be directly stored in the voltage vector giving unit 911 in advance or may be obtained through comparison and calculation according to the target voltage vector $U_s$. It is assumed that the synthesized voltage vector falls in the I-th sector, and the equivalent condition is shown in the formula described below.

$$0° < \arctan(u_\beta/u_\alpha) < 60° \quad (10)$$

Figure 12:
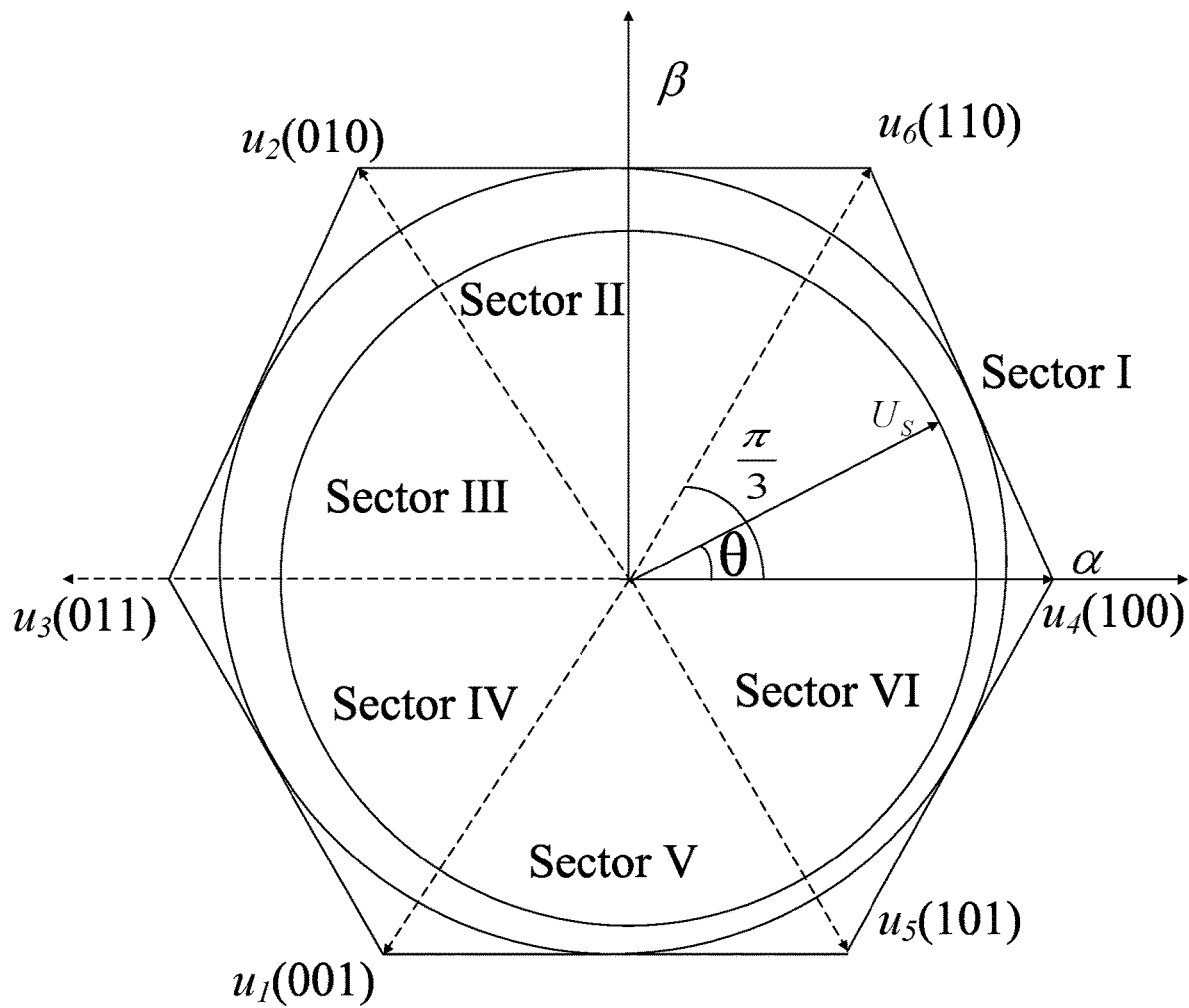
FIG. 12 is a voltage space vector diagram.

Through the preceding equivalent condition in conjunction with the geometric relationship analysis of the voltage space vector diagram in FIG. 12, the necessary and sufficient conditions for the synthesized target voltage vector $U_s$ to fall in the N-th sector may be determined, and the following Table 3 is obtained.

TABLE 3

| Sector | Necessary and Sufficient Condition for Falling in this Sector |
|---|---|
| I | $u_\alpha > 0$, $u_\beta > 0$, and $u_\beta/u_\alpha < \sqrt{3}$ |
| II | $u_\alpha > 0$ and $u_\beta/|u_\alpha| > \sqrt{3}$ |

TABLE 3-continued

| Sector | Necessary and Sufficient Condition for Falling in this Sector |
|---|---|
| III | $u_\alpha < 0$, $u_\beta > 0$, and $-u_\beta/u_\alpha < \sqrt{3}$ |
| IV | $u_\alpha < 0$, $u_\beta < 0$, and $u_\beta/u_\alpha < \sqrt{3}$ |
| V | $U\beta < 0$ and $-u_\beta/|u_\alpha| > \sqrt{3}$ |
| VI | $u_\alpha > 0$, $u_\beta < 0$, and $-u_\beta/u_\alpha < \sqrt{3}$ |

When the sector is determined, three decision variables A, B, and C are introduced. The values of A, B, and C are determined according to two components $u_\alpha$ and $u_\beta$ of the given target voltage vector $U_s$ to be synthesized. The following relational expressions are given below.

$$\begin{cases} u_\beta > 0 & A = 1 \text{ else } A = 0 \\ \sqrt{3}u_\alpha - u_\beta > 0 & B = 1 \text{ else } B = 0 \\ -\sqrt{3}u_\alpha - u_\beta > 0 & C = 1 \text{ else } C = 0 \end{cases} \quad (11)$$

The position of the sector is described as: N=A+2B+4C. The positions of the corresponding sectors when N takes different values are shown in FIG. 12. In this manner, one target voltage vector is given so that the sector where the target voltage sector $U_s$ is located may be determined, and thus two basic voltage vectors $u_i$ and the zero vector at the boundary of the sector are the two basic voltage vectors $u_i$ and the zero vector that synthesize the target voltage vector $U_s$.

In step S13, the action time of the basic voltage vector and the zero vector is determined.

After the basic voltage vector $u_i$ and the zero vector are determined, the vector action time unit 912 needs to determine the action time of the basic voltage vector $u_1$ and the zero vector. The action time of the basic voltage vector $u_i$ and the zero vector may be obtained through calculation by querying Table 2 as described above and using the formulas of the variables X, Y, and Z, and the action time of the zero vector may be expressed as: $T_0/T_7=T-T_1-T_2$. Details are not described here again.

In step S14, the switching time point of the basic voltage vector and the zero vector is determined.

After the action time of the basic voltage vector $u_i$ and the zero vector is determined, the timer of the vector switching point unit 913 is set to a continuous up/down counting mode, and the timer times the action time of the calculated basic voltage vector $u_i$ and the zero vector to determine the vector switching point. The vector switching point corresponds to the switching point of the PWM signal.

The PWM signal to be generated is determined according to the basic voltage vector, the zero vector, and the switching time point of the basic voltage vector and the zero vector.

In step S15, the PWM signal is generated.

The PWM signal generation module 920 generates the PWM signal according to the PWM signal determined in the preceding process and outputs the PWM signal to the power drive module 930. As an example, the PWM signal generated by the PWM signal generation module 920 is described in Table 4 (FIGS. 14A and 14B).

In Table 4 (FIGS. 14A and 14B), PWMA denotes the state of the control signals sent to the switch elements VT1 and VT4 on the first bridge arm 902a. In the case where the PWMA signal is 1, the upper bridge arm switch element VT1 is turned on; and in the case where the PWMA signal is 0, the lower bridge arm switch element VT4 is turned on. Similarly, PWMB denotes the state of the control signals sent to the switch elements VT3 and VT6 on the second bridge arm 902b. In the case where the PWMB signal is 1, the upper bridge arm switch element VT3 is turned on; and in the case where the PWMB signal is 0, the lower bridge arm switch element VT6 is turned on. PWMC denotes the state of the control signals sent to the switch elements VT5 and VT2 on the third bridge arm 902c. In the case where the PWMC signal is 1, the upper bridge arm switch element VT5 is turned on; and in the case where the PWMC signal is 0, the lower bridge arm switch element VT2 is turned on.

The sector I is used as an example. In the generated three-phase wave modulation waveform during the sampling time period T, the basic voltage vector $u_t$ and the zero vector appear in the order of $u_4$, $u_6$, $u_7$, $u_7$, $u_6$, $u_4$. The switch states $S_A$, $S_B$, and $S_C$ and three-phase waveforms are as described in the third column of Table 4 (FIGS. 14A and 14B), and the on-time of each switch element is as shown in the three-phase waveforms below.

In step S16, the drive circuit is controlled by using the generated PWM signal so that the brushless motor operates at a basically constant rotation speed.

The power drive module 930 outputs the PWM signal shown in Table 4 (FIGS. 14A and 14B) to the drive circuit 902, and the drive circuit 902 acts according to the PWM signal output by the controller 903 so that the brushless motor 901 is controlled to drive at least one of the spool 111 and the head housing 112 to overcome the maximum resistance to rotate. In this manner, in the automatic winding mode, the rotation speed of the motor is constant, the winding speed is stable, and the control effect of stable low speed and high torque of the motor can be achieved so that the user experience is better, which is conducive to the winding operation. Moreover, the following problem can be avoided: when the spool 111 reverses at a low speed relative to the head housing 112, the resistance to which the spool 111 is subjected fluctuates greatly since the transmission surfaces between the spool 111 and the head housing 112 are designed as inclined surfaces so that the rotation speed of the brushless motor 901 is unstable, the winding speed is unstable, and the user experience is poor. In addition, the motor, the spool, the head housing, and the grass trimmer rope can be protected effectively.

In other examples, at least in the automatic winding mode, the controller 903 outputs a control signal according to the given current to control the drive circuit 902 so that the motor 901 operates at a basically constant rotation speed. The amplitude of the given current enables the controller 903 to output a control signal so that at least one of the spool 111 and the head housing 112 overcomes the maximum resistance among the varying resistances.

What is claimed is:

1. A grass trimmer comprising:
   a grass trimmer head;
   a brushless motor to drive the grass trimmer head to rotate to cut vegetation;
   a drive circuit connected to the brushless motor to drive the brushless motor to output power; and
   a controller connected to the drive circuit to control the drive circuit;
   wherein the grass trimmer head comprises a spool and a head housing, the spool winds a grass trimmer rope, and the head housing accommodates the spool;
   wherein the grass trimmer has an automatic winding mode and during the automatic winding mode the brushless motor drives at least one of the spool and the head housing so that the spool and the head housing rotate relatively and the grass trimmer rope is automatically wound onto the spool; and
   wherein the controller outputs a control signal to the drive circuit according to at least one of a given voltage and a given current so that a rotation speed of the brushless motor is substantially constant in the automatic winding mode.

2. The grass trimmer of claim 1, wherein in the automatic winding mode the spool and the head housing are subjected to varying resistances and the at least one of the given voltage and the given current enables the controller to output the control signal so that the at least one of the spool and the head housing overcomes a resistance with a maximum resistance value among the varying resistances.

3. The grass trimmer of claim 2, wherein the varying resistances fluctuate periodically.

4. The grass trimmer of claim 2, wherein the controller comprises:
   a PWM signal determination module to calculate and determine, according to the given voltage, a PWM signal output by the controller so that the at least one of the spool and the head housing overcomes the resistance with the maximum resistance value among the varying resistances; and
   a PWM signal generation module to generate a PWM signal according to the PWM signal determined by the PWM signal determination module to control the drive circuit.

5. The grass trimmer of claim 4, wherein the PWM signal determination module comprises:
   a voltage vector giving unit to give a target voltage vector, wherein an amplitude of the target voltage vector is equal to an amplitude of the given voltage;
   a vector action time unit to determine, according to the target voltage vector given by the voltage vector giving unit, action time of a basic voltage vector and a zero vector that synthesize the target voltage vector, wherein an input terminal of the vector action time unit is connected to an output terminal of the voltage vector giving unit; and
   a vector switching point unit to determine a switching time point of the basic voltage vector and the zero vector; and wherein an input terminal of the vector switching point unit is connected to an output terminal of the vector action time unit.

6. The grass trimmer of claim 1, wherein the controller in the automatic winding mode, outputs the control signal to the drive circuit, according to the at least one of the given voltage and the given current, to generate a rotating magnetic field in the brushless motor, wherein the at least one of the spool and the head housing rotates substantially synchronously with the rotating magnetic field.

7. The grass trimmer of claim 1, wherein the at least one of the spool and the head housing rotates around a central axis, the central axis coincides with an axis of a drive shaft, the drive shaft is driven by the brushless motor to drive the grass trimmer head, the spool is formed with a first inclined surface, the head housing is formed with a second inclined surface, and the first inclined surface and the second inclined surface are inclined to a normal plane of the central axis; and, in the automatic winding mode, the first inclined surface and the second inclined surface contact each other and slide relatively so that the spool and the head housing rotate relatively.

8. The grass trimmer of claim 7, wherein the spool is formed with a plurality of first meshing teeth arranged circumferentially around the central axis, each of the plurality of first meshing teeth is formed with the first inclined surface, the head housing is formed with a plurality of first engaging teeth engaged with the plurality of first meshing teeth, and each of the plurality of first engaging teeth is formed with the second inclined surface.

9. The grass trimmer of claim 8, wherein two adjacent ones of the plurality of first meshing teeth are spaced apart from each other by a dimension in a circumferential direction of the central axis.

10. The grass trimmer of claim 8, wherein the grass trimmer further has a cutting mode, the plurality of first meshing teeth and the plurality of first engaging teeth stop each other in the cutting mode, and the plurality of first meshing teeth and the plurality of first engaging teeth contact each other and slide relatively in the automatic winding mode.

11. The grass trimmer of claim 8, wherein the first inclined surface formed on each of the plurality of first meshing teeth is inclined along a circumferential direction of the central axis and the second inclined surface formed on each of the plurality of first engaging teeth is inclined along the circumferential direction of the central axis.

12. The grass trimmer of claim 1, wherein the grass trimmer further has a cutting mode, the spool and the head housing rotate synchronously in the cutting mode, the controller controls the drive circuit in a first control mode so that the brushless motor operates at a first rotation speed in the cutting mode and the controller controls the drive circuit in a second control mode so that the brushless motor operates at a second rotation speed in the automatic winding mode, and the second rotation speed is less than the first rotation speed.

13. The grass trimmer of claim 12, wherein a value range of a ratio of the first rotation speed to the second rotation speed is 10 to 100.

14. The grass trimmer of claim 12, wherein the controller, in the cutting mode, enables the brushless motor to rotate along a first direction at the first rotation speed; and in the automatic winding mode, enables the brushless motor to rotate along a second direction at the second rotation speed, wherein the first direction is opposite to the second direction.

15. The grass trimmer of claim 1, wherein the grass trimmer is powered by a power supply and a value range of a ratio of the given voltage to a voltage of the power supply is 0.1 to 0.5.

16. A control method for a grass trimmer comprising:
providing the grass trimmer with an automatic winding mode, a grass trimmer head, a brushless motor to drive the grass trimmer head, a drive circuit to drive the brushless motor to operate, and a controller to control the drive circuit; and in the automatic winding mode, outputting a control signal from the controller to the drive circuit according to at least one of a given voltage and a given current so that a rotation speed of the brushless motor is substantially constant.

17. The control method for the grass trimmer of claim 16, wherein the grass trimmer head comprises a spool and a head housing, the spool winds a grass trimmer rope, and the head housing accommodates the spool and, in the automatic winding mode, the spool and the head housing are subjected to varying resistances and the at least one of the given voltage and the given current enables the controller to output the control signal so that at least one of the spool and the head housing overcomes a resistance with a maximum resistance value among the varying resistances.

18. The control method for the grass trimmer of claim 17, wherein at least one of the head housing and the spool rotates around a central axis, the central axis coincides with an axis of a drive shaft, and the drive shaft is driven by the brushless motor to drive the grass trimmer head; the spool is formed with a first inclined surface, the head housing is formed with a second inclined surface, and the first inclined surface and the second inclined surface are inclined to a normal plane of the central axis; and in the automatic winding mode, the first inclined surface and the second inclined surface contact each other and slide relatively so that the spool and the head housing rotate relatively.

19. The control method for the grass trimmer of claim 17, wherein the grass trimmer further has a cutting mode, wherein in the cutting mode, the spool and the head housing rotate synchronously; wherein the controller, in the cutting mode, controls the drive circuit in a first control mode so that the brushless motor operates along a first direction at a first rotation speed; and in the automatic winding mode, the controller controls the drive circuit in a second control mode so that the brushless motor operates along a second direction at a second rotation speed, wherein the second rotation speed is less than the first rotation speed, and the second direction is opposite to the first direction.

20. The control method for the grass trimmer of claim 16, wherein the control method for the grass trimmer further comprises: giving a target voltage vector, wherein an amplitude of the target voltage vector is equal to an amplitude of the given voltage; determining a basic voltage vector and a zero vector that synthesize the target voltage vector; determining action time of the basic voltage vector and the zero vector; determining a switching time point of the basic voltage vector and the zero vector; and determine a PWM signal according to the basic voltage vector, the zero vector, and the switching time point of the basic voltage vector and the zero vector.

* * * * *